United States Patent [19]
Ishii et al.

[11] Patent Number: 5,410,225
[45] Date of Patent: Apr. 25, 1995

[54] VIDEO CAMERA AND CAMERA SYSTEM EMPLOYING APERTURE CONTROL

[75] Inventors: Satoshi Ishii, Kita-adachi; Hiroyuki Hashimoto, Souka; Haruo Saitoh, Kuki, all of Japan

[73] Assignee: Aiwa Co., Ltd., Tokyo, Japan

[21] Appl. No.: 934,761

[22] Filed: Aug. 24, 1992

[30] Foreign Application Priority Data

| Aug. 30, 1991 | [JP] | Japan | 3-219749 |
| Sep. 9, 1991 | [JP] | Japan | 3-229207 |
| Sep. 9, 1991 | [JP] | Japan | 3-229208 |
| Sep. 9, 1991 | [JP] | Japan | 3-229209 |
| Sep. 25, 1991 | [JP] | Japan | 3-245385 |
| Mar. 25, 1992 | [JP] | Japan | 4-067249 |

[51] Int. Cl.⁶ ........................... H04N 5/235
[52] U.S. Cl. ..................... 348/229; 348/371; 354/418
[58] Field of Search ............ 358/228, 209, 909; H04N 5/232; 354/413, 418; 348/207, 229, 371

[56] References Cited

U.S. PATENT DOCUMENTS

| 4,365,272 | 12/1982 | Nagai | 358/228 |
| 4,458,995 | 7/1984 | Ishida et al. | 354/418 X |
| 4,768,876 | 9/1988 | Okino | 356/4 |
| 4,860,108 | 8/1989 | Saito et al. | 358/909 X |
| 4,879,600 | 11/1989 | Ise et al. | 358/228 X |
| 4,954,897 | 9/1990 | Ejima et al. | 358/228 |
| 4,989,093 | 1/1991 | Kaneko | 358/213.19 |
| 5,155,581 | 10/1992 | Tanaka et al. | 358/29 |

FOREIGN PATENT DOCUMENTS

| 0326825 | 8/1989 | European Pat. Off. |
| 0371422 | 6/1990 | European Pat. Off. |
| 0443818 | 8/1991 | European Pat. Off. |
| 2149264 | 6/1985 | United Kingdom |

OTHER PUBLICATIONS

Patent Abstracts of Japan, vol. 14, No. 54 (P-999) Jan. 31, 1990, JP-A-01 280 735, (Abstract) Nov. 10, 1989.

Primary Examiner—Joseph Mancuso
Assistant Examiner—Wendy R. Greening
Attorney, Agent, or Firm—Dellett and Walters

[57] ABSTRACT

In a video camera in strobe mode, when a condition for strobe light emission is ready, the aperture of an iris is reduced and the gain of an AGC amplifier is fixed at a predetermined value. Accordingly, a dark image representing the condition ready for strobe light emission is displayed on an electronic view finder, and in addition saturation of charge accumulation is prevented.

5 Claims, 27 Drawing Sheets

|   | a | b | c | d | e |
|---|---|---|---|---|---|
| A1 | Cy+G | Ye+Mg | Cy+G | Ye+Mg | Cy+G |
| B1 | G+Cy | Mg+Ye | G+Cy | Mg+Ye | G+Cy |
| A2 | Cy+Mg | Ye+G | Cy+Mg | Ye+G | Cy+Mg |
| B2 | Mg+Cy | G+Ye | Mg+Cy | G+Ye | Mg+Cy |

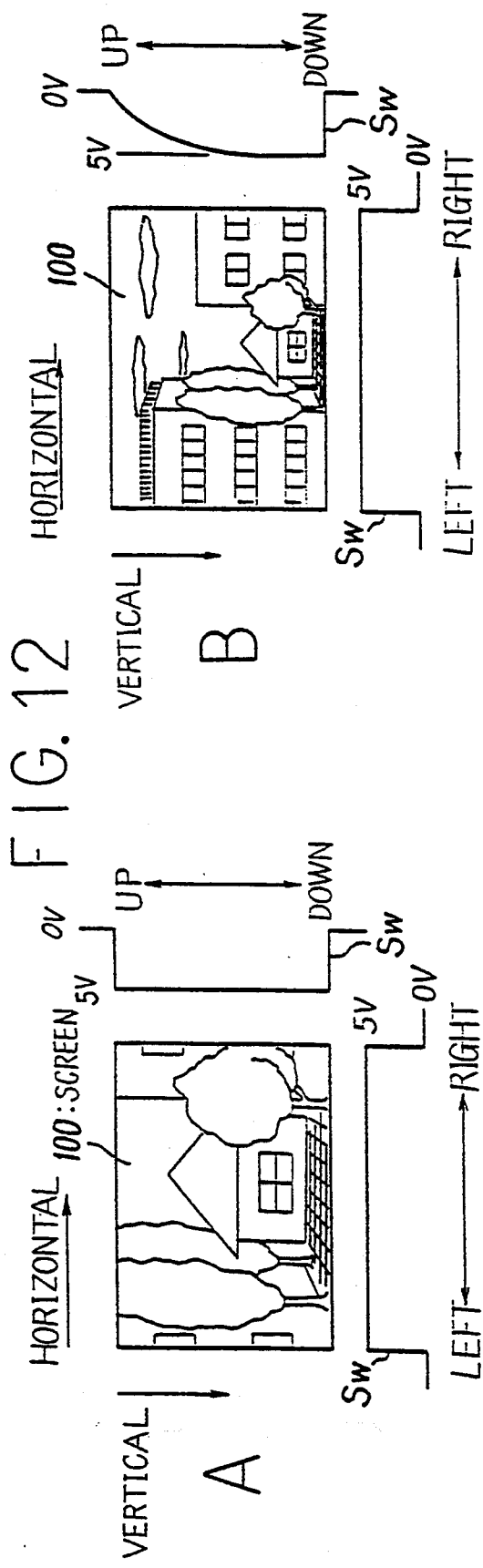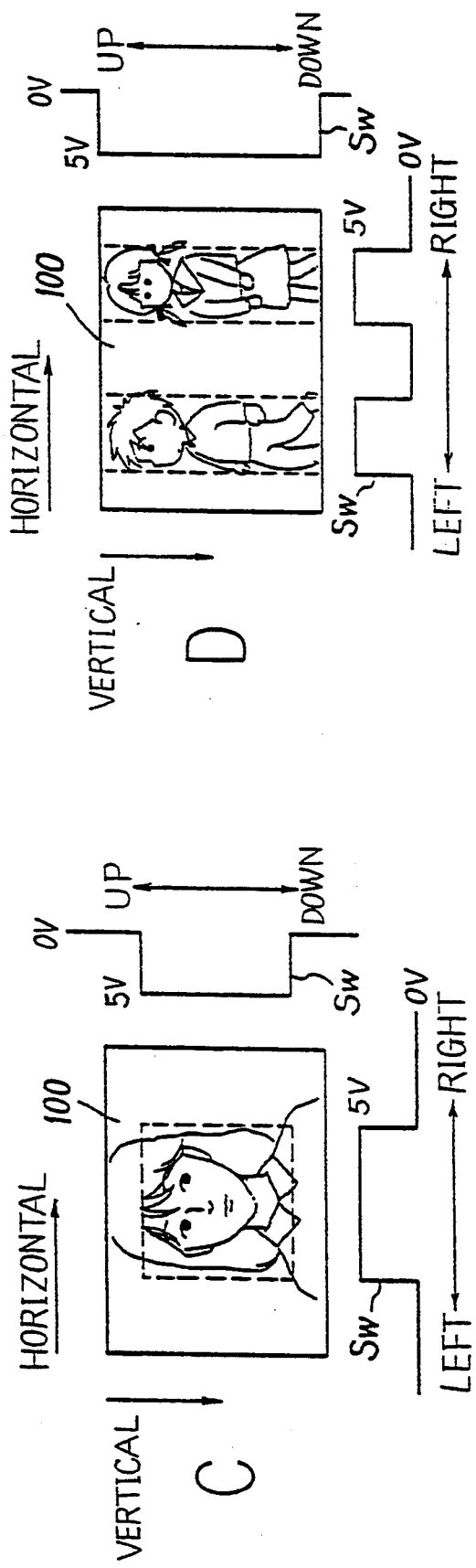
FIG. 12

FIG. 16
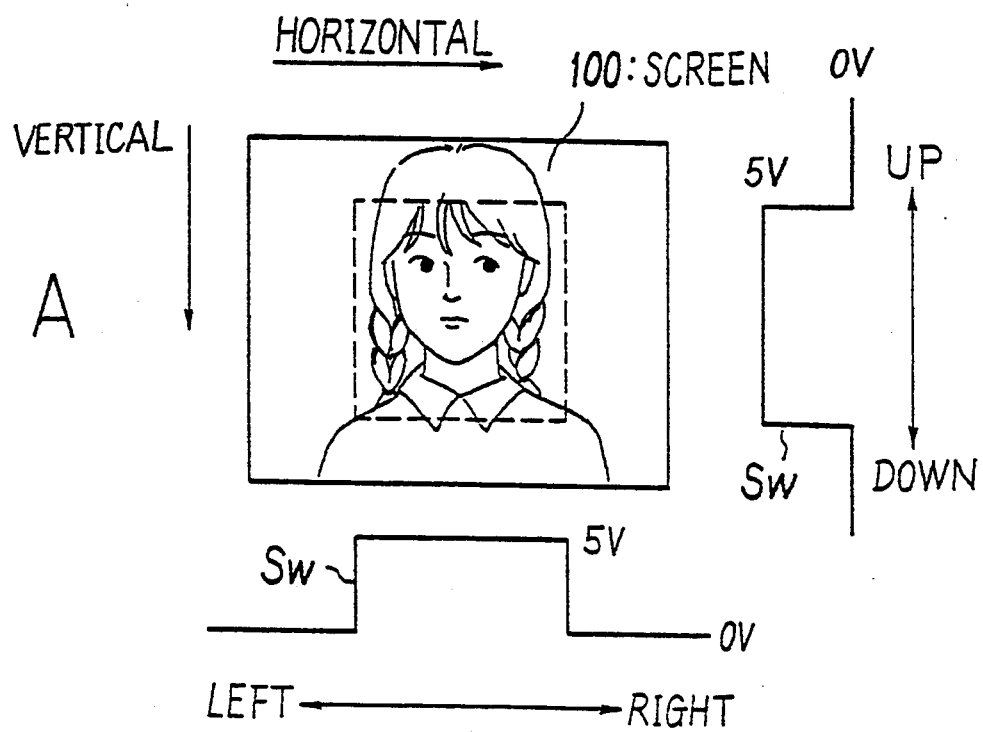
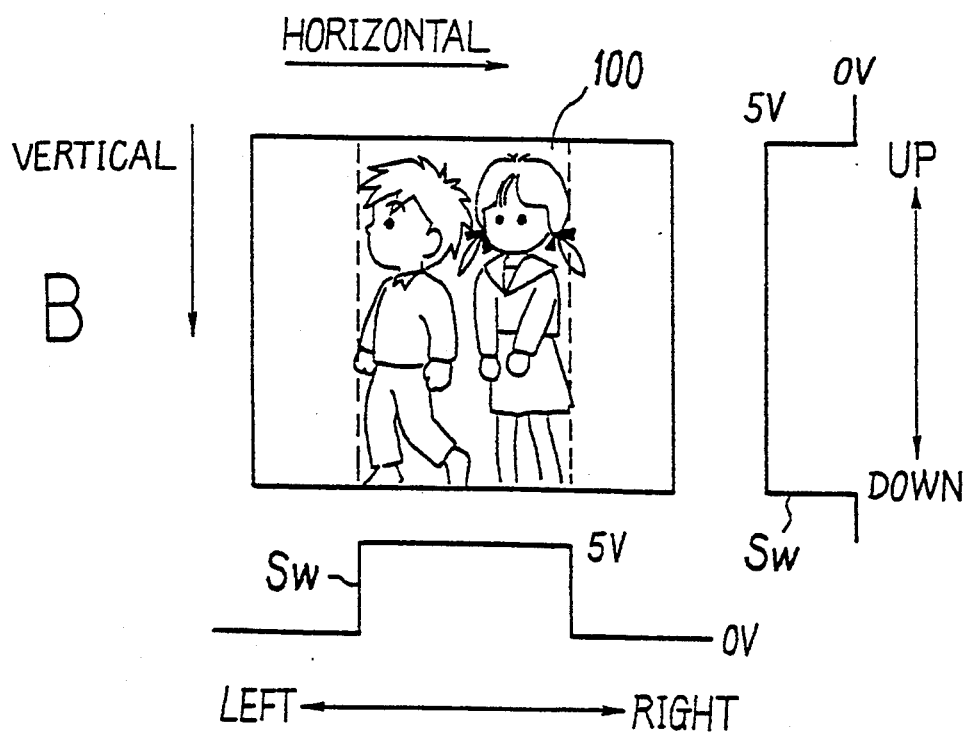

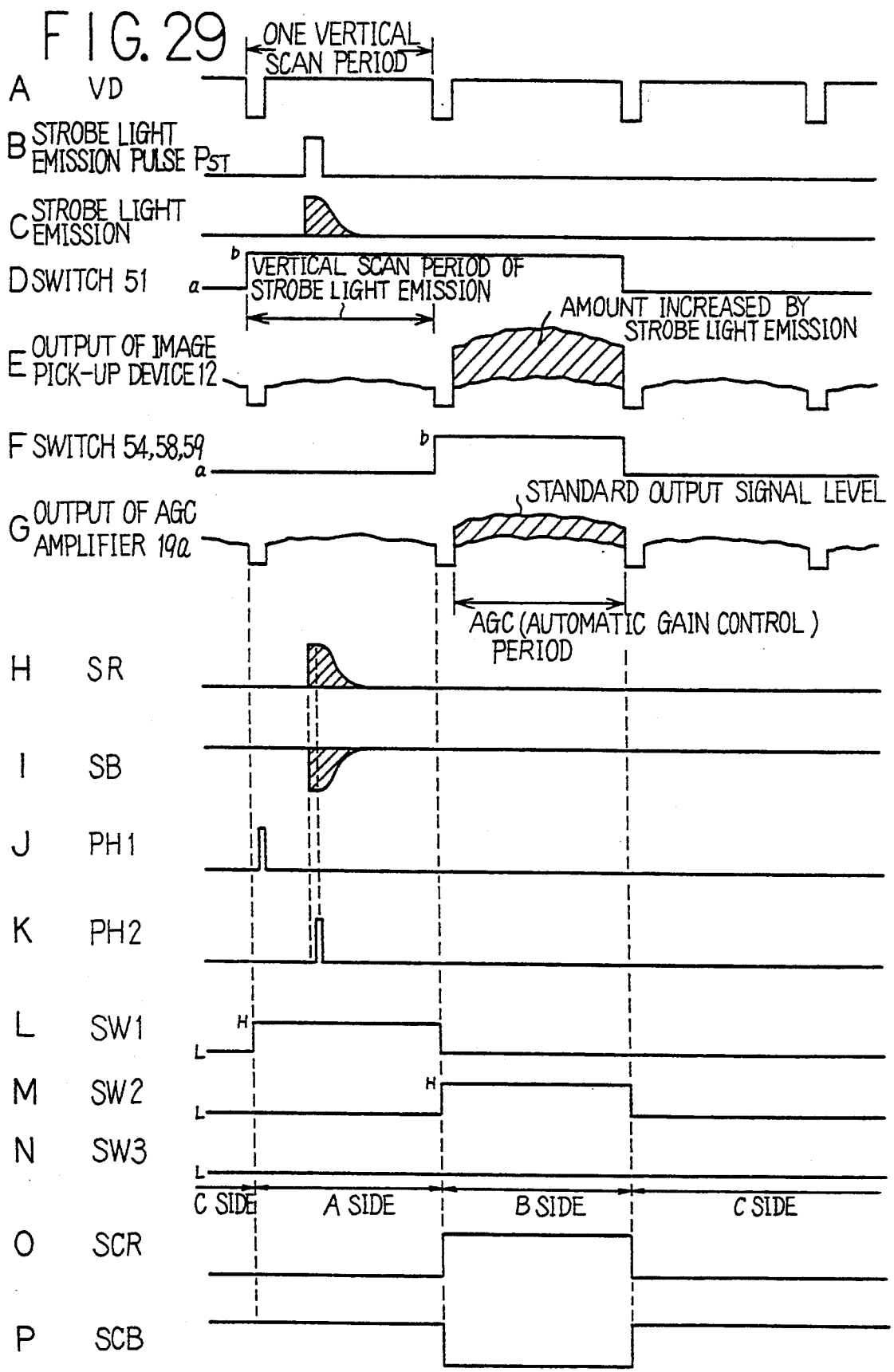

VIDEO CAMERA AND CAMERA SYSTEM EMPLOYING APERTURE CONTROL

BACKGROUND OF THE INVENTION

The present invention relates to a video camera, photo-camera and camera-system having light emission means such as a strobe which illuminates an foreground object (in short, object) with light emitted.

Using a video camera permits both a dynamic image and a still image to be obtained. It may be thought to use a strobe so as to provide adequate charge accumulation in an image pick-up device when light from an foreground object (in short, object light) is insufficient to photograph a still picture.

In the meantime, in a case where an image pick-up device having an electronic shutter function is used under the condition that an amount of strobe light is constant, the level of the image picked-up signal output is subject to be reduced with a shorter charge accumulation time and a smaller amount of charge accumulation as shutter speed is less shortened.

There is an idea that if object light is insufficient strobe light emission may automatically be carried out by detecting the level of the image picked-up signal and recognizing an amount of object light. In the idea above, for example, in a case when a person or thing in such a back light that substantially raises an level of an image picked-up signal is to be picked up; if an level of whole picked-up image signal is to be merely detected as a representative amount of object light, strobe light may not be emitted because the light on object is recognized to be sufficient. Consequently, the person or thing in the back light is subject to be picked up without a sufficient amount of object light.

In the meantime, in a case where a photo-camera (film-camera) is used, a strobe is generally utilized when object light is insufficient. Some of photo-cameras (film-cameras), having a means that an amount of object light is detected by an optical sensor such as a photo-diode so that strobe light emission is automatically carried out when object light is insufficient, have heretofore been well known.

If an optical sensor is used as a detector, however, an level of whole picked-up image signal is to be detected as a representative amount of object light. Accordingly, in a case when a person or thing in a back light is to be picked up, strobe light may not be emitted because of being recognized that amount of light from the object is sufficient. Therefore, the person or thing in a back light is subject to be picked up without a sufficient amount of object light.

Meanwhile, in a case when a strobe is used on a video camera so as to provide adequate charge accumulation in an image pick-up device, a shutter needs to be operated with depression of the button after the strobe is fully charged over a threshold value of voltage and ready to emit strobe light.

Further, great light due to strobe light emission is incident on the image pick-up device when a strobe is used. For this reason, the use of strobo may result in the saturation of charge accumulated in the image pick-up device.

On the other hand, a still-video camera which permits a picked-up image signal to sufficiently increase by compensating the loss of object light with strobe light emission has heretofore been proposed. This proposal teaches that amount of strobe light emission and charge accumulation time in an image pick-up device are determined and controlled in accordance with amount of object light detected by an optical sensor. In that conventional case, however, it has been a disadvantage of high purchase price level regarding a set of still-video camera that an optical sensor is needed to detect object light

SUMMARY OF THE INVENTION

An object of the present invention is to provide a video camera, in which an image picked-up signal level effected by strobe light emission remains constant even when shutter speed is changed.

A further object of the present invention is to provide a photo-camera and camera system, in which an image of a particular object intended to be picked up can be obtained in a good condition with sufficient light.

A yet further object of the present invention is to provide a video camera, in which strobe light emission may certainly be carried out at the time when a shutter button is depressed for the shutter to be operated, and in which saturation of charge accumulation in an image pick-up device can be prevented.

A yet another object of the present invention is to provide a video camera, in which an image picked-up signal level can be controlled so as to remain constant without an optical sensor.

In a video camera aspect of the present invention, there is provided a video camera, which comprises light emission means, an Auto-Gain-Control amplifier for controlling the level of an image picked-up signal outputted from an image pick-up device, and control means for controlling an amount of light emission of said light emission means in accordance with a control signal of said Auto-Gain-Control amplifier.

In a camera system aspect of the present invention, there is provided a camera system, which comprises an image pick-up device, light emission means, pattern selecting means for selecting one window pattern between multiple window patterns corresponding to respective areas predetermined in a screen, level detection means for detecting the level of a particular signal corresponding to a window pattern being selected by said pattern selecting means, which is taken from an image picked-up signal outputted from said image pick-up device, and control means for controlling an amount of light emission of said light emission means in accordance with a detection output of said level detection means.

In another camera system aspect of the present invention, there is provided a camera system, which comprises an image pick-up device, light emission means, pattern selecting means for selecting one window pattern between multiple window patterns corresponding to respective areas predetermined in a screen in accordance with focus information, level detection means for detecting the level of a particular signal corresponding to a window pattern being selected by said pattern selecting means, which is taken from an image picked-up signal outputted from said image pick-up device, and control means for controlling an amount of light emission of said light emission means in accordance with a detection output of said level detection means.

In another video camera aspect of the present invention, there is provided a video camera, which comprises light emission means, an iris for controlling an amount of incident light on an image pick-up device, an Auto- Gain-Control amplifier for controlling the level of an image picked-up signal outputted from said image pick-up device, mode setting means for setting light emission mode in which said light emission means is used, voltage detection means for detecting charge voltage of said light emission means, and control means for reducing an aperture of said iris and fixing the gain of said Auto-Gain-Control amplifier at a predetermined value when said charge voltage exceeding the threshold value is detected by said voltage detection means, in said light emission mode.

In a further video camera aspect of the present invention, there is provided a video camera, which comprises light emission means for illuminating a foreground object being picked up by an image pick-up device, an amplifier for controlling gain of an image picked-up signal outputted from said image pick-up device, level detection means for detecting the level of an output signal of said amplifier and supplying a detection signal thereof as a control signal to said amplifier, and control means for controlling the gain of said amplifier in order to regulate the output signal thereof at a constant level, when an image picked-up signal of said foreground object being picked up with light emission of said light emission means is outputted from said image pick-up device.

In a still further video camera aspect of the present invention, there is provided a video camera, which comprises light emission means for illuminating a foreground object being picked up by an image pick-up device, a white balance control circuit to which an image picked-up signal outputted from said image pick-up device is supplied, a white balance sensor for obtaining said colour temperature information for white balance control, and control means for controlling colour temperature information from a white balance sensor to be timely outputted in accordance with light emission of said light emission means and to be supplied to said white balance control circuit, when an image picked-up signal of a foreground object being picked up with light emission of said light emission means is supplied to said white balance control circuit.

According to the present invention, although as shutter speed becomes faster the level of an image picked-up signal outputted from an image pick-up device is less reduced with a smaller amount of charge accumulated in the image pick-up device, the level of an image picked-up signal outputted from an Auto-Gain-Control amplifier may remain constant by controlling an amount of light emission of said light emission means in accordance with an control signal to the Auto-Gain-Control amplifier since the control signal accords with the level of the image picked-up signal (effectively, with the illumination intensity being affected by a change of shutter speed) outputted from the image pick-up device, even if shutter speed is changed, Further, According to the present invention, in a case that a window pattern corresponding to an intended object to be picked up is selected by pattern selecting means, the intended object may be picked up with a sufficient amount of light because light emission means is controlled to effect light emission in accordance with illumination intensity represented by the level of an image picked-up signal of the intended object, which is detected by level detection means.

Further, According to the present invention, in a case that a window pattern corresponding to an intended object to be picked up is automatically selected in accordance with focus information, the intended object may be picked up with a sufficient amount of light because light emission means is controlled to effect light emission in accordance with illumination intensity represented by the level of an image picked-up signal of the intended object, which is detected by level detection means.

Further, According to the present invention, in light emission mode, when charge voltage of light emission means exceeds a threshold value for light emission, the aperture of an iris 11 is reduced and afterwards a control voltage to an Auto-Gain-Control amplifier is fixed at a predetermined value, so that the level of an image picked-up signal outputted from the Auto-Gain-Control amplifier is decreased. For that reason, an image displayed on a viewfinder, for instance, is made dark so that the condition for light emission of the light emission means may be confirmed with a view of the image, and accordingly light emission of the light emission means may certainly be effected when a shutter button is depressed to be operated. Besides, in light emission mode, a great amount of light due to light emission of light emission means is not incident on an image pick-up device, since the aperture of an iris is reduced When charge voltage exceeds a threshold value for light emission. Accordingly, saturation of charge accumulation can be prevented.

Further, According to the present invention, in no particular periods, an output signal of an Auto-Gain-Control amplifier is regulated at a constant level by controlling gain of the Auto-Gain-Control amplifier in accordance with an output signal of level detection means. On the other hand, in particular periods of light emission of light emission means, the gain of the Auto-Gain-Control amplifier is controlled by control means, so that the output signal of the Auto-Gain-Control amplifier is regulated to be at a constant level even though the level of an image picked-up signal from an image pick-up device increases. Therefore, a video camera or a camera system according to the present invention may inexpensively be constructed, compared with other one in which an amount of light emission of light emission means is controlled in accordance with an amount of light from a foreground object, which is detected by an optical sensor.

Further, According to the present invention, white balance control for an image picked-up signal of a foreground object being picked up with light emission of light emission means is performed in accordance with colour temperature information being timely outputted from a white balance sensor in accordance with light emission of light emission means. Accordingly, regardless of effect of other sources of light besides light emission means, white balance involving the effect thereof is controlled so that white balance control for an image picked-up signal of a foreground object being picked up with light emission of light emission means may excellently be carried out.

The objects advantages and novel features of the present invention will be apparent from the following detailed description when read in conjunction with the appended claims and attached drawings.

BRIEF DESCRIPTION OF THE DRAWINGS

FIG. 12 is a schematic representation showing examples of window pattern;

FIG. 16 is a schematic representation showing another examples of window pattern;

FIG. 29 is a waveform chart for explaining another operations in particular periods of strobe light emission.

DETAILED DESCRIPTION OF THE INVENTION

One embodiment of the present invention will be described with reference to the drawings. This embodiment comprises a video camera and photo-camera, these cameras being made integral with each other.

Figure 1:
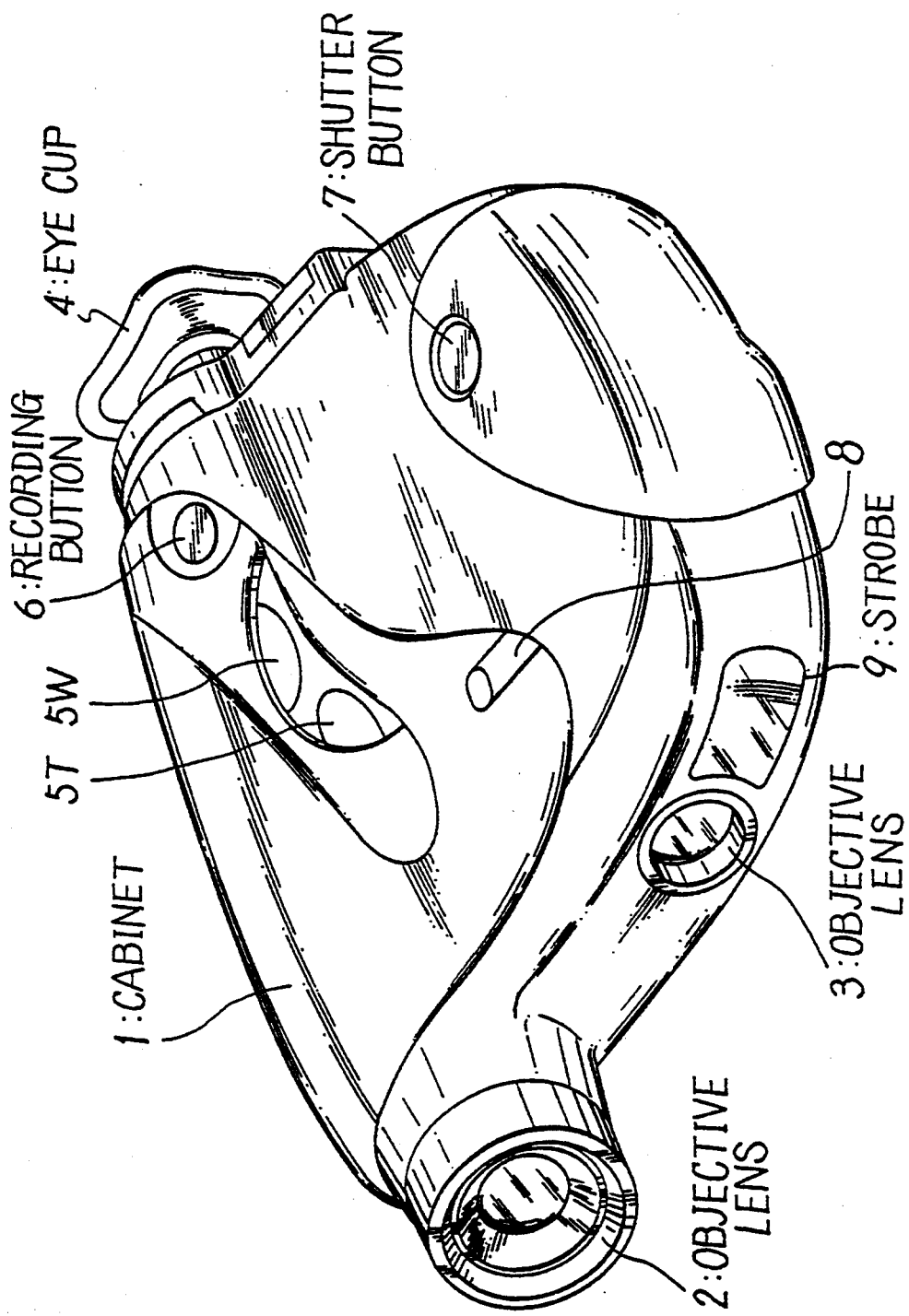
FIG. 1 is a perspective view showing an external appearance of an embodiment of the present invention.

FIG. 1 is a perspective view showing the structure of the embodiment. Referring to the Figure, designated at 1 is a cabinet. Although not shown, in the cabinet are accommodated a video camera section comprising an image pick-up device, a signal processing circuit and so forth and a photo-camera section comprising a film loading mechanism, a film drive mechanism and so forth.

Designated at 2 is an objective lens of a video camera section. The video camera section and photo-camera section include independent optical systems. The objective lens 2 is a 6-time zoom lens with a focal distance f of 7 to 42 mm. Another objective lens 3 is also used, which is a fixed focal point lens with a focal distance f of 55 mm.

In this embodiment, an electronic viewfinder comprising a small size CRT is provided in the cabinet 1. Images picked up by the video camera section, through the objective lens 2, are displayed on the CRT. At reference numeral 4 is designated an eye cup. No viewfinder is provided, by which the images through the objective lens 3 picked up by the photo-camera section is directly confirmed.

Designated at 5T and 5W are zoom operation buttons for zoom operations in TEL and WIDE directions, respectively. Designated at 6 is a recording button for recording an image picked-up video signal outputted from the video camera section in a VTR. Designated at 7 is a shutter button, at 8 a film rewind button and at 9 a strobe.

Figure 2:
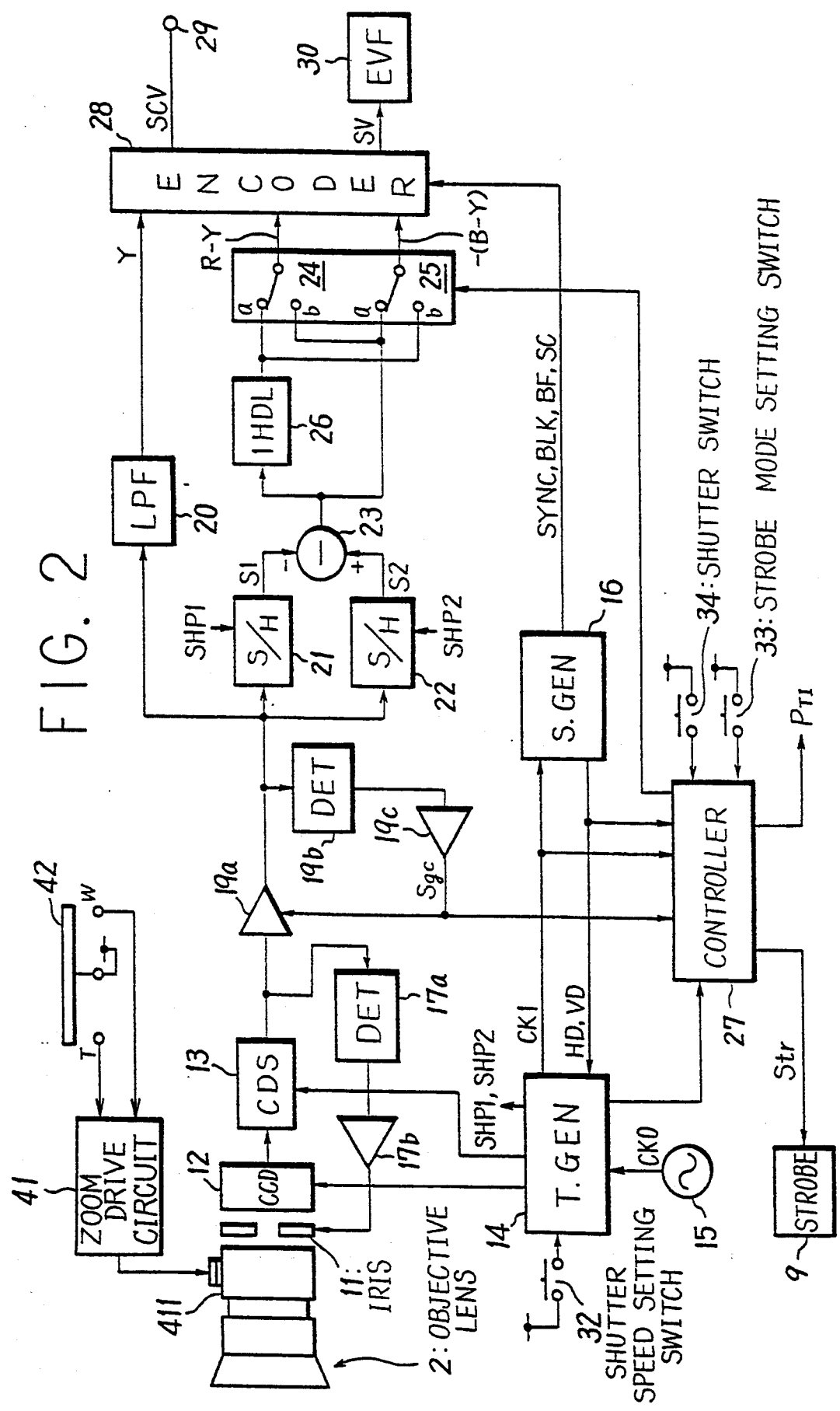
FIG. 2 is a schematic block diagram of a video camera section.

FIG. 2 is a schematic block diagram of the video camera section of this embodiment. Image light from an object is supplied through the objective lens 2 and an iris 11 to a single plate type CCD solid-state image pick-up device 12, which has complementary colour checkered type colour filters.

Figure 3:
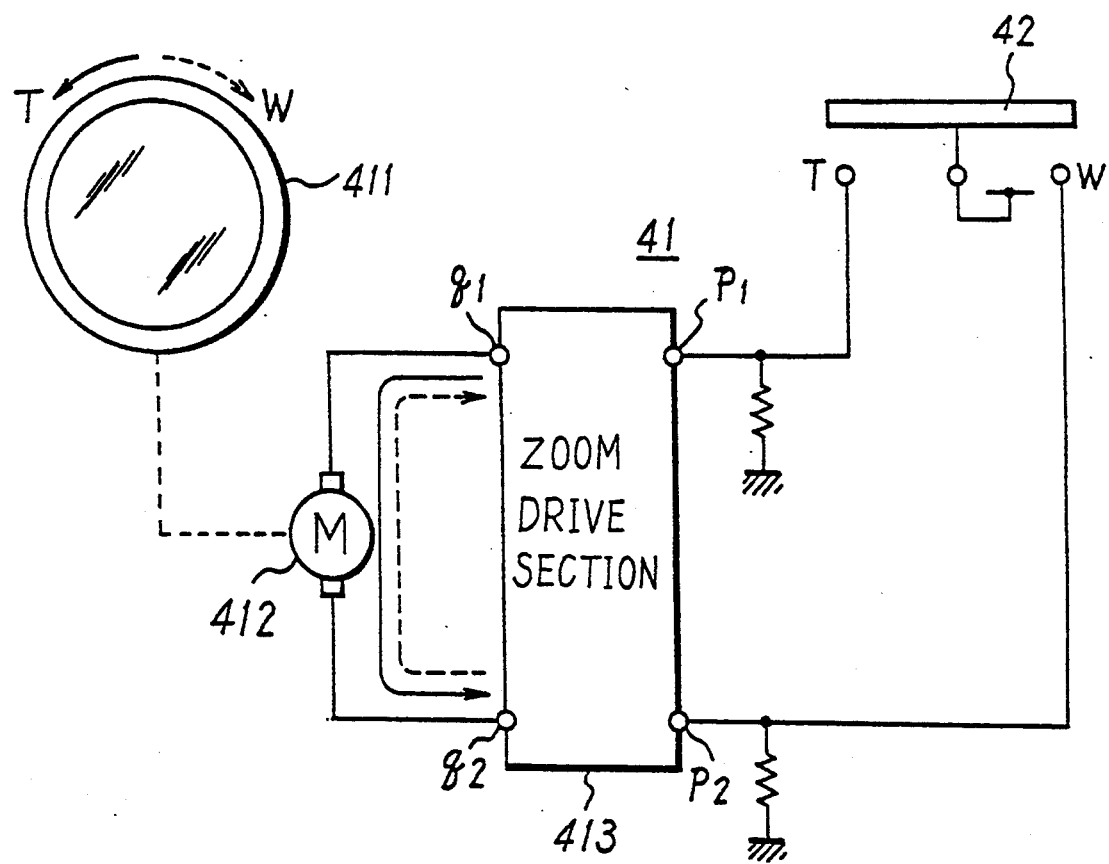
FIG. 3 is a schematic diagram showing construction of a zoom drive circuit.

The zooming factor control of the image pick-up lens 2 is effected by a zoom drive circuit 41. FIG. 3 shows a specific construction of the zoom drive circuit 41. Referring to the Figure, designated at 411 is a lens constituting the objective lens 2 and serving to control the zooming factor. The lens 411 is rotatably driven back and forth to control the zooming factor. For example, the position of the lens 411 is adjusted in TEL direction by rotating the lens 411 in direction T and in WIDE direction by rotating the lens in direction W.

The lens 411 is rotatably driven by a DC motor 412. The DC motor 412 is connected between output terminals q1 and q2 of a zoom driver section 413. The zoom drive section 413 has its input terminals p1 and p2 connected to respective T and W side fixed terminals of a zoom switch 42.

When a high level "H" signal is supplied to the terminal p1, current is caused to pass from the terminal q1 through the motor 412 to the terminal q2 (as shown by a solid line) to rotatably drive the lens 411 in direction T. Conversely, when the high level "H" signal is supplied to the terminal p2, current is caused to pass from the terminal p2 through the motor 412 to the terminal q1 (as shown by a dashed line) to rotatably drive the lens 411 in direction W. When no high level "H" signal is supplied to both of the terminals p1 and p2, no current is caused in the motor 412, and hence the lens 411 is not rotatably driven in any direction but is held at the prevailing position.

The zoom switch 42 has its movable terminal connected to a power supply terminal. When the zoom operation buttons 5T and 5W of the cabinet 1 described above are depressed, a connection in the zoom switch 42 is made on T side and W side, respectively. When a connection in the zoom switch 42 is made on T side and W side, the high level "H" signal is supplied to the terminals p1 and p2, respectively, of the zoom drive section 413 so as to effect zoom control in the respective TEL and WIDE directions.

Figures 4, 5:
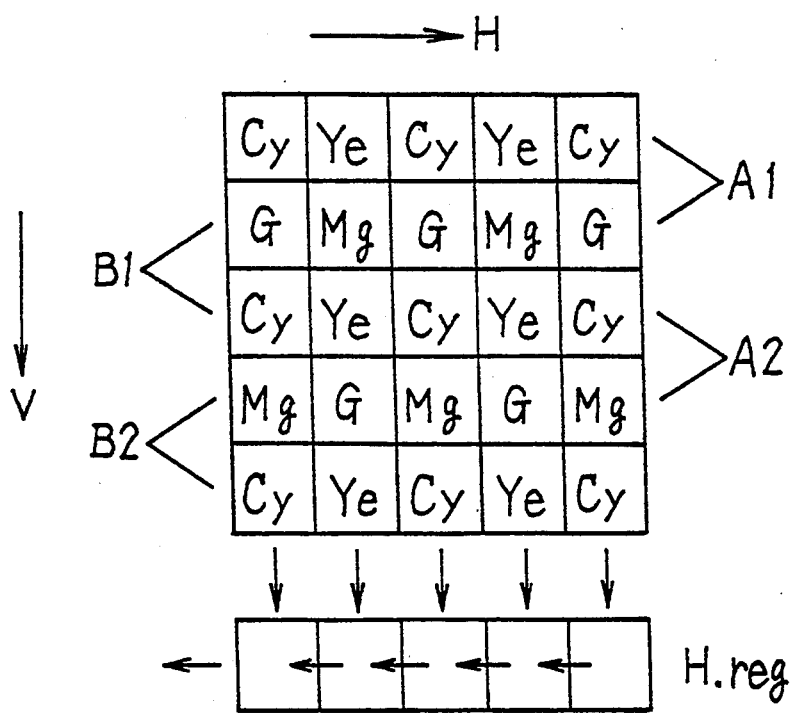
FIG. 4 is an illustration for explaining a colour coding format of an image pick-up device.
FIG. 5 is an illustration showing outputs of a horizontal output register in an image pick-up device.

FIG. 4 shows a colour coding format of the image pick-up device 12 in field reading. In field A, charge mixture of the pair A1 and next the pair A2 are effected. In field B, charge mixture of the pairs B1 and next the pair B2 are effected. The charge is outputted from a horizontal shift register Hreg in the order of A1, A2, . . . in field A and in the order of B1, B2, . . . in field B.

FIG. 5 shows that the outputs of the horizontal shift register labeled a, b . . . are in the order of outputs of charge. For line A1, the order of the charge output is (Cy+G), (Ye+Mg), . . . In line A2, it is (Cy+Mg), (Ye+G). . . . In line B1, it is (G+Cy), (Mg+Ye) . . . In line B2, it is (Mg+Cy), (G+Ye), . . .

Referring to FIG. 2 again, the output signal of an image pick-up device 12 is supplied to a CDS (correlated double sampling) circuit 13. By using the CDS circuit 13, it is possible to reduce reset noise as is well known in the art.

Timing pulses necessary for the image pick-up device 12 and CDS circuit 13 are supplied from a timing pulse generator 14. To the timing pulse generator 14 is supplied a reference clock CK0 at 8 fsc (fsc representing the colour subcarrier frequency) from an oscillator 15, and are also supplied horizontal and vertical sync signals HD and VD from a sync signal generator 16. To the sync signal generator 16 is supplied a clock CK1 at 4 fsc from the timing pulse generator 14.

Although not mentioned above, an image pick-up device 12 has an electronic shutter function. A shutter speed is set by a shutter speed setting switch 32 connected to a timing pulse generator 14. Information on a shutter speed is supplied from the timing pulse generator 14 to controller 27. Accordingly, the shutter speed setting switch 32 may also be provided on the side of the controller 27, alternatively.

In this embodiment, an image picked-up signal outputted from the CDS circuit 13 is supplied to a level detector 17a, which detects the level of the image picked-up signal and whose output signal is next transmitted to an iris 11 through an iris drive circuit 17b, so as to effect automatic control of the stop of the iris 11.

A process of obtaining the luminance signal Y and the chrominance signal (i.e., colour difference signal) from the image picked-up signal outputted from the CDS circuit 13 will now be described.

The luminance signal Y is obtained by adding adjacent signals together, that is, by adding signals in the order of a+b, b+c, c+d, d+e . . . with reference to FIG. 5.

For line A1, for instance, the luminance signal Y is approximated as follows. Cy, Ye and Mg are respectively Cy=B+G, Ye=R+G and Mg=B+R.

$$Y = ((Cy + G) + (Ye + Mg)) \times 1/2$$
$$= (2B + 3G + 2R) \times 1/2$$

For line A2, it is approximated as $$Y = ((Cy + Mg) + (Ye + G)) \times 1/2$$
$$= (2B + 3G + 2R) \times 1/2$$

Similar approximation is made for the other lines in field A and lines in field B as well.

The chrominance signal is obtained by subtracting adjacent signals one from the other.

For line A1, for instance, the chrominance signal is approximated as $$R - Y = (Ye + Mg) - (Cy + G)$$
$$= (2R - G)$$

For line A2, it is approximated as $$-(B - Y) = (Ye + G) - (Cy - Mg)$$
$$= -(2B - G)$$

Similar approximation is made for the other lines in field A and lines in field B as well, and red colour difference signal R−Y and blue colour difference signal −(B−Y) signal are obtained alternately in line sequence.

Referring to FIG. 2 again, an image picked-up signal outputted from a CDS circuit 13 is supplied to an AGC circuit 19a. The output signal from the AGC amplifier 19a is supplied to a level detector 19b, whose output signal is next supplied as control signal Sgc back to the AGC amplifier 19a through a buffer 19c and also supplied to a controller 27 at the same time.

The image picked-up signal outputted from the AGC amplifier 19a is supplied to a low-pass filter 20, which constitutes a luminance processor. The low-pass filter 20 adds (i.e., averages) adjacent signals together and thus outputs luminance signal Y.

Figure 6:
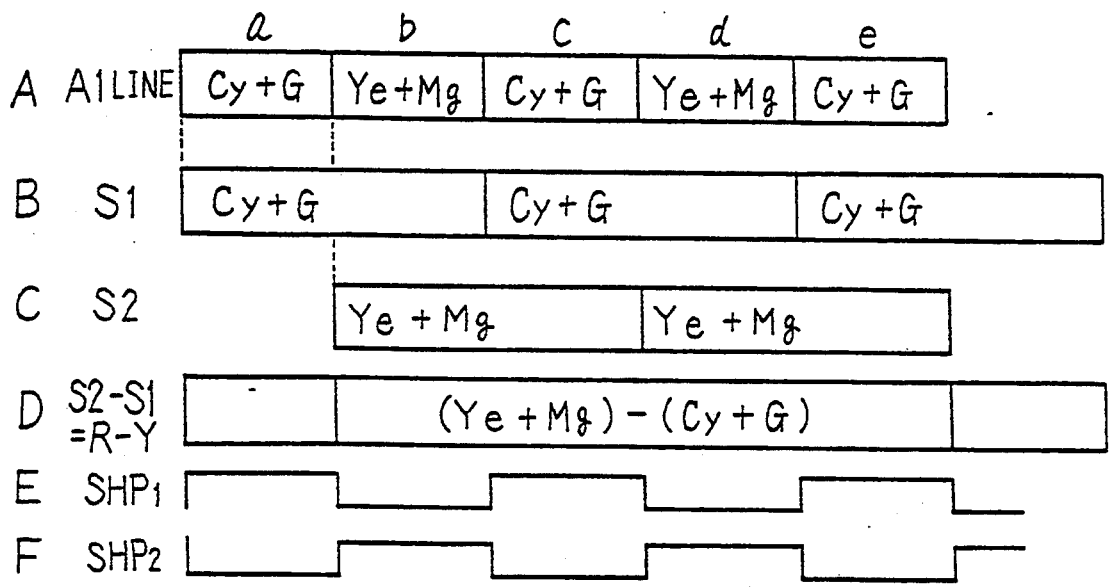
FIG. 6 is an illustration for explaining colour signal processing.
Figure 7:
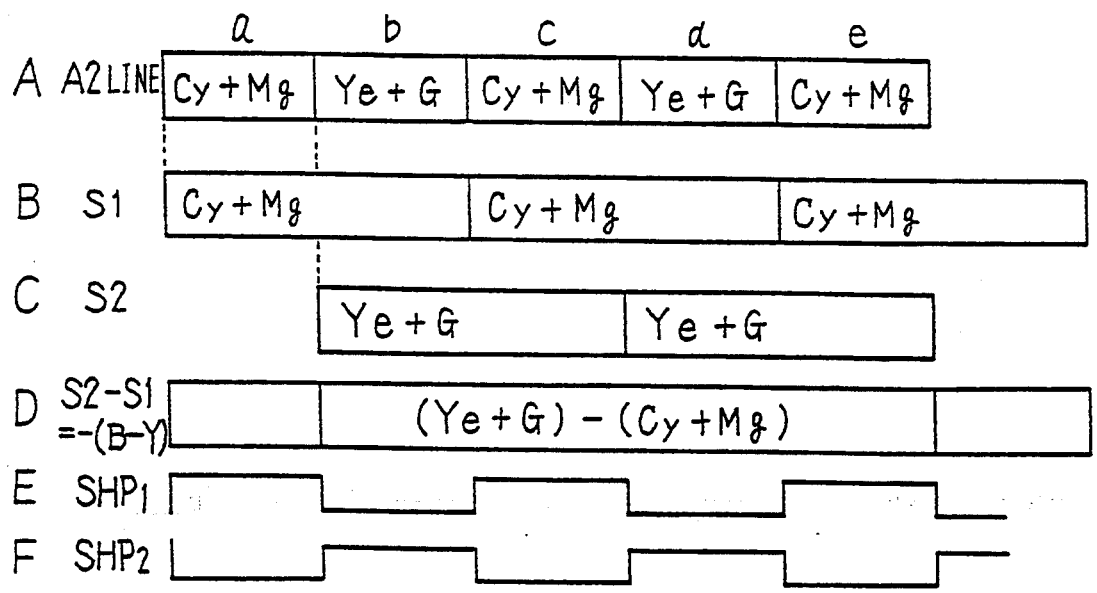
FIG. 7 is an illustration for explaining colour signal processing.

The image picked-up signal outputted from the AGC amplifier 19a is also supplied to sample/hold circuits 21 and 22, which constitute a chrominance processor. To the sample/hold circuits 21 and 22 are supplied the sampling pulses SHP1 and SHP2 (shown at E and F in FIGS. 6 and 7) from a timing pulse generator 14. Shown at A in FIG. 6 is the signal for the line A1, and at A in FIG. 7 the signal for the line A2.

A continuous signal S1 of (Cy+G) or (Cy+Mg) (as shown at B in FIG. 6 or 7) is outputted from the sample/hold circuit 21 and supplied to a subtractor 23. Another continuous signal S2 of (Ye+Mg) or (Ye+G) (as shown at C in FIG. 6 or 7) is outputted form the other sample/hold circuit 22 and supplied to the subtractor 23.

In the subtractor 23, the signal S1 is subtracted from the signal S2. The subtractor 23 thus outputs red colour difference signal R−Y and blue colour difference signal −(B−Y) alternately in line sequence (as shown at D in FIGS. 6 and 7).

The colour difference signal output of the subtractor 23 is supplied directly to the fixed contact on b side of a selecting switch 24 and to the fixed contact on a side of a selecting switch 25, and also supplied through a delay circuit 26, which provides a delay time of one horizontal scan period, to the fixed contact on b side of the selecting switch 24 and to the fixed contact on a side of the selecting switch 25.

Switching of connections in the selecting switches 24 and 25 is controlled by a controller 27. More specifically, during the horizontal scan period, during which the red colour difference signal R−Y is outputted from the subtractor 23, connections in the selecting switches 24 and 25 are made on b side, and during the horizontal scan period, during which the blue colour difference signal −(B−Y) is provided, they are made on a side.

To the controller 27 are supplied sync signals HD and VD as reference sync signals from a sync signal generator 16, and also supplied a clock CK1 from a timing pulse generator 14.

Since connections in the selecting switches 24 and 25 are switched in the above way, in each horizontal scan period the red and blue colour difference signals (R−Y) and −(B−Y) are outputted from the respective selecting switches 24 and 25.

The luminance Y outputted from a low-pass filter 20 and colour difference signals (R−Y) and −(B−Y) outputted from the selecting switches 24 and 25 are supplied to an encoder 28. To the encoder 28 are supplied a composite sync signal SYNC, a blanking signal BLK, a burst flag signal BF and a colour subcarrier signal SC from the sync signal generator 16.

In the encoder 28, the sync signal SYNC is added with respect to the luminance signal Y in the well-known matter. With respect to the colour difference signals, orthogonal two-phase modulation is effected to form a carrier chrominance signal C, while colour burst signal is added. The luminance and chrominance signals Y and C are combined to form a NTSC system colour video signal SCV, for example, which is outputted from the encoder 28 to be provided for an output terminal 29.

The encoder 28 further outputs a monochrome video signal SV (i.e., luminance signal Y with sync signal SYNC), which is supplied to an electronic viewfinder 30, and then picked-up images are displayed on the small size CRT.

A strobe mode setting switch 33 is connected to a controller 27. By turning on the switch 33, strobe mode is set up turning from normal mode. In strobe mode, when a shutter switch 34 connected to the controller 27 is turned on in response to a depression of a shutter button 7 (shown in FIG. 1), the controller 27 supplies a strobe light emission trigger signal Str to a strobe 9 in order to effect strobe light emission in the next field.

In strobe mode, an amount of strobe light emission is controlled so that an image picked-up signal level outputted from AGC amplifier 19a remains constant, by means of a control signal Sgc supplied from a level detector 19b to the AGC amplifier 19a. The control signal Sgc accords with an image picked-up signal level outputted from an image pick-up device, consequently, with illumination intensity on object if the iris 11 is full-open.

Figure 8:
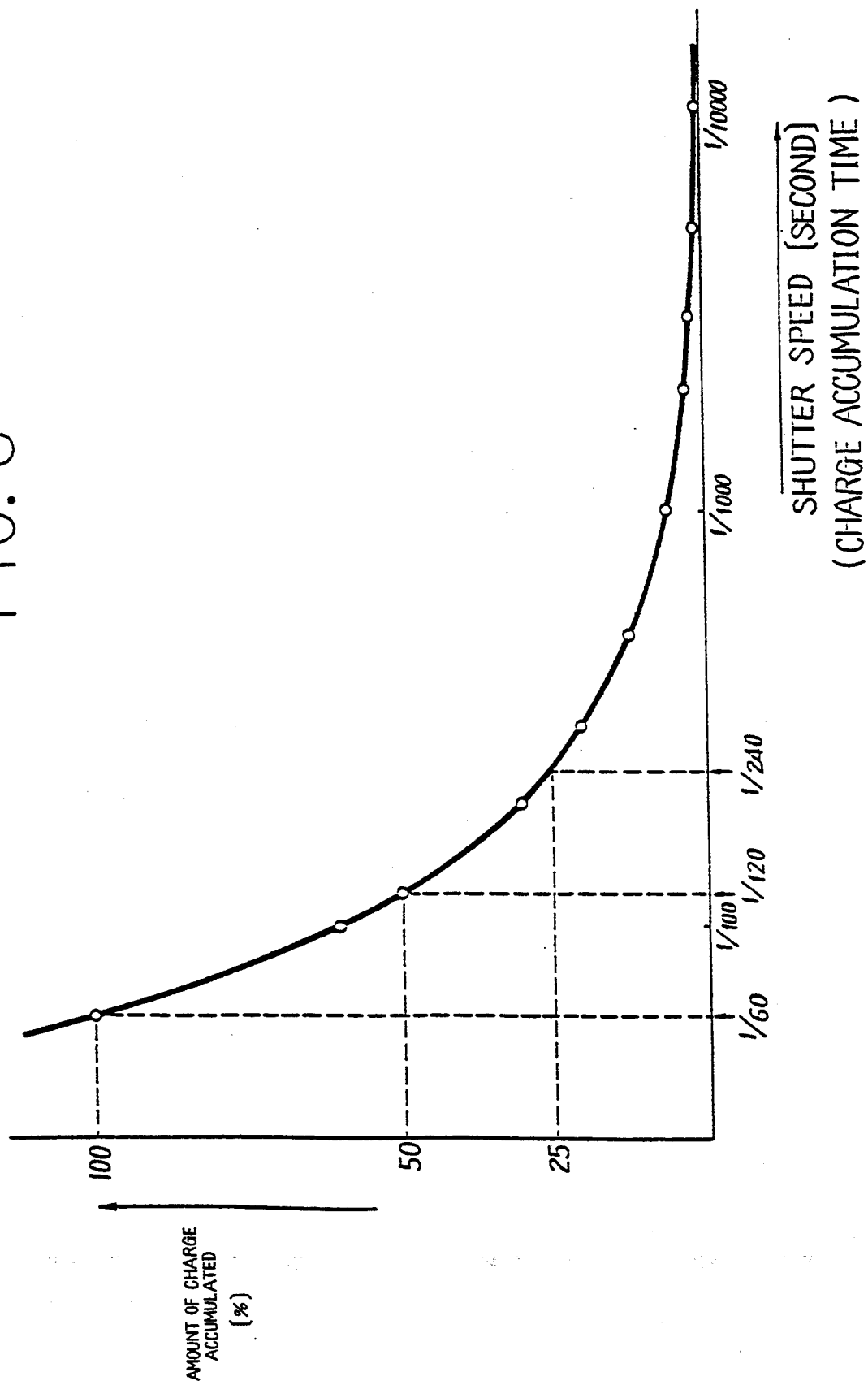
FIG. 8 is a graph showing the relation between shutter speed and amount of charge accumulated.

On the other hand, even if illumination intensity on object remains constant, as a shutter speed becomes faster the image picked-up signal level is subject to be less reduced with a shorter charge accumulation time and a smaller amount of charge accumulated. FIG. 8 represents the relation between shutter speeds (charge accumulation time) and an amount of charge accumulated during the period, and indicates the amount of charge accumulation to be 100% at a shutter speed (charge accumulation time) of 1/60 of second. It is shown that an amount of charge accumulation, consequently, illumination intensity on object is to be less reduced with a faster shutter speed ( a shorter charge accumulation time)

Figure 9:
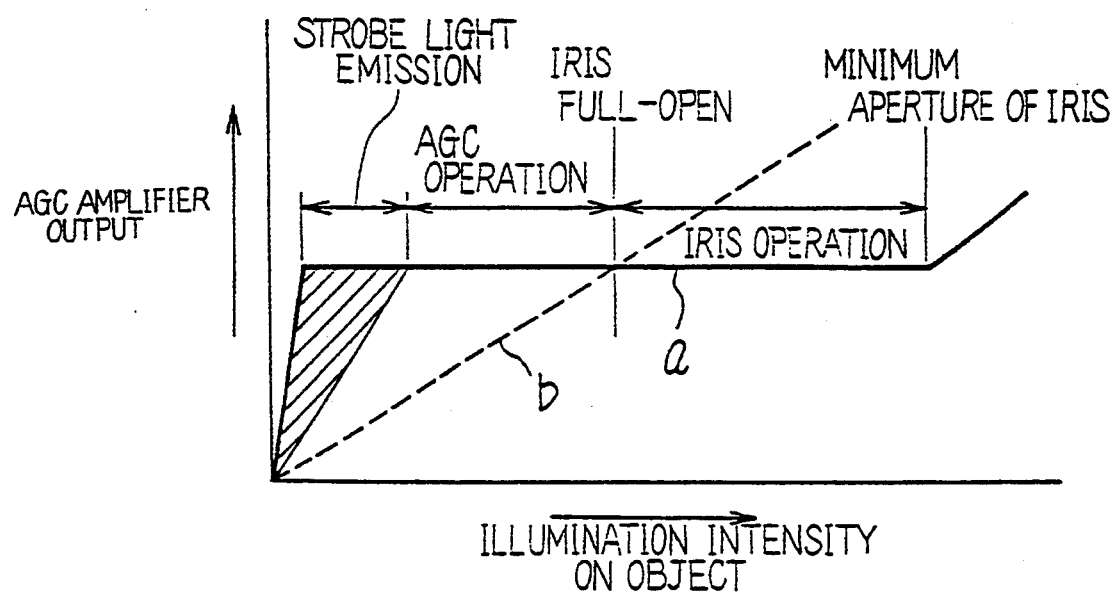
FIG. 9 is a graphical representation showing the relation between illumination intensity on object and AGC amplifier output.

The solid line a in FIG. 9 shows the relation between illumination intensity on object and an output of an AGC amplifier 19a, and the dashed line b shows the relation between them in a case that an AGC amplifier gain is fixed at the gain value at the time when an iris 11 becomes full-open. While a hatching part of the Figure represents the amount of output of the AGC amplifier 19a, increased by strobe light emission.

In the meantime, an electronic shutter function in an image pick-up device 12 is performed by the process in which a charge sweep-out pulse is successively supplied from a timing pulse generator 14 to the image pick-up device 12 during such a charge sweep-out period that charge accumulation time in a field becomes equal to a shutter speed selected. Therefore, the period (charge sweep-out period) during which a charge sweep-out pulse is supplied in a field becomes longer as shutter speed faster.

In this embodiment, a strobe light emission trigger signal Str supplied from a controller 27 to a strobe 9 is timely controlled so as to be more delayed as a shutter speed becomes faster, in order to cause the strobe light emission to peak within charge accumulation time.

Figure 10:
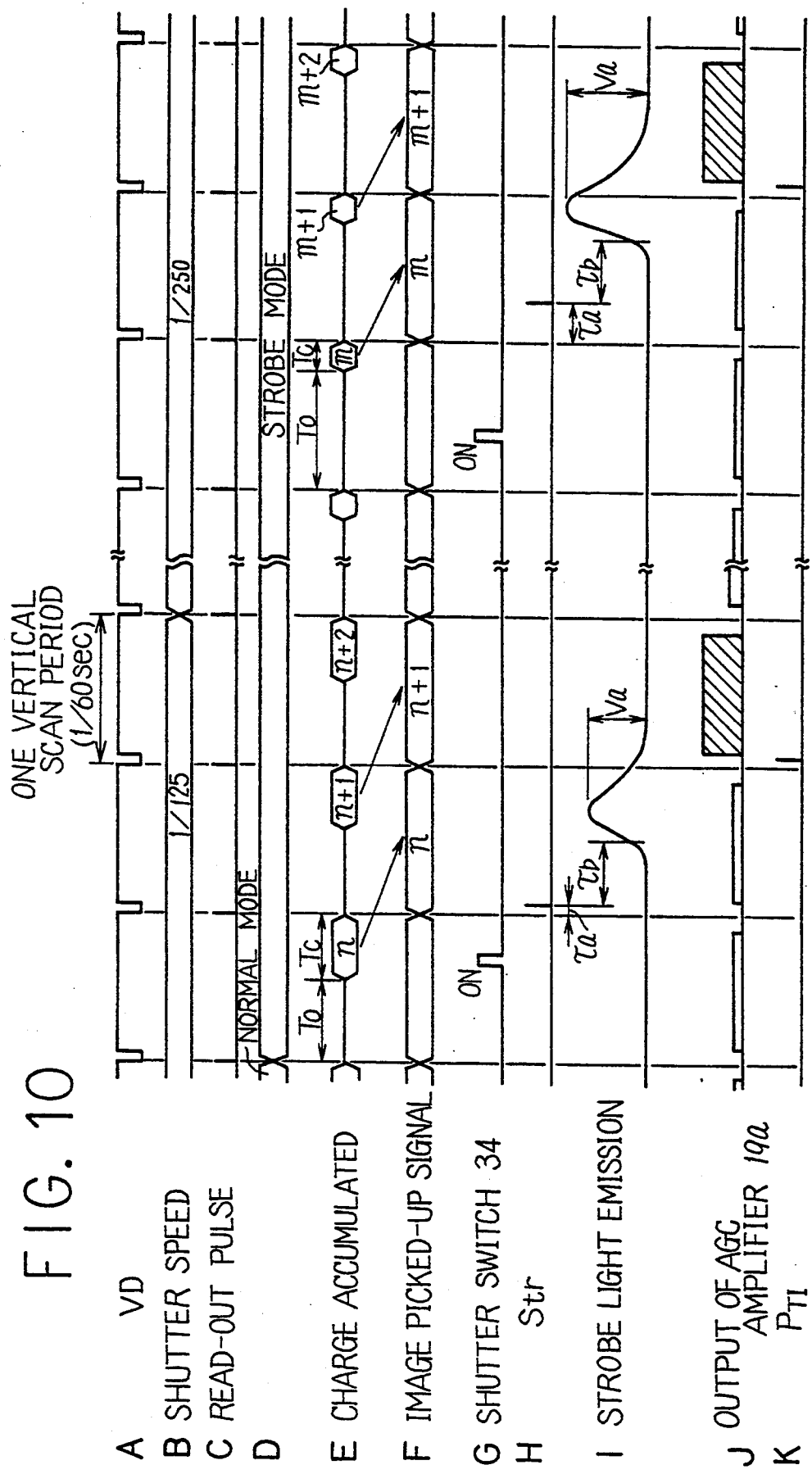
FIG. 10 is a waveform chart showing operations in strobe mode.

In the above construction, when a strobe mode setting switch 33 is turned on, strobe mode is set up turning from normal mode in synchronization with the next vertical sync signal VD (as shown at D in FIG. 10). Shown at A in FIG. 10 is the vertical sync signal VD.

Each of vertical scan period is constituted of: charge sweep-out period To for a charge sweep-out pulse supplied to an image pick-up device 12, and charge accumulation time Tc for a charge accumulated in an image pick-up device 12. The charge accumulation is shown as at E in FIG. 10. The charge sweep-out period is so controlled that charge accumulation time Tc becomes equal to a shutter speed selected. Shown at B in FIG. 10 is an example of shutter speed which is halfway turned over from 1/125 of second to 1/250 of second.

A read pulse is supplied to the image pick-up device 12 at the end of each vertical scan period (as shown at C in FIG. 10). Therefore, a charge accumulated in the image pick-up device 12 is formed as shown at E in FIG. 10. On the other hand, an image picked-up signal from the image pick-up device 12, afterwards from AGC amplifier 19a, is outputted with a delay of one vertical scan period, as shown at F in FIG. 10.

After a shutter switch 34 is turned on (as shown at G in FIG. 10), a strobe light emission trigger signal is supplied from a controller 27 to a strobe 9 in the next vertical scan period, in synchronization with the next vertical sync signal VD (as shown at H in FIG. 10). The strobe light emission trigger signal Str is generated at a time τ a after the vertical sync signal VD, and the time τ a varies with shutter speed so that the light emission of the strobe 9 peaks within charge accumulation time (refer to E and I in FIG. 10). At I in FIG. 10, τ b represents the period of time between the supply of the strobe light emission trigger signal Str and the actual effect of light emission by the strobe 9, and this period of time τ a is a fixed amount.

A change of shutter speed, causing charge accumulation time to change, results in the condition being as if illumination intensity on object is actually changed. Therefore, as a shutter speed becomes faster, an image picked-up signal level outputted from an AGC amplifier 19a is less reduced (as shown at J in FIG. 10), in a case that illumination intensity on object is in a range of strobe light emission effect (refer to FIG. 9).

The image picked-up signal level effected by light emission of a strobe 9, however, remains constant(as shown by a hatching part at J in FIG. 10) even when shutter speed is changed, because an amount of light emission of the strobe 9 is controlled in accordance with a control signal Sgc to the AGC amplifier 19a, which corresponds to the illumination intensity on object.

Incidentally, K shown in FIG. 10 represents a take-in pulse PTI outputted from a control let 27. By mean of this take-in pulse PTI, an image picked-up signal for one frame (one vertical scan period): either (n+1) or (m+1) in the Figure, which is picked up with effect of light emission of a strobe 9, can be latched into, for instance, in a still image recorder connected to an output terminal 29

As shown above, in this embodiment, an image picked-up signal level outputted from an AGC amplifier 19a may remain constant even when shutter speed is changed and hence illumination intensity on object is effectively changed, because an amount of strobe light emission is controlled in accordance with a control signal Sgc to the AGC amplifier 19a.

Further, it is possible to efficiently utilize light emission of a strobe 9, since a strobe light emission trigger signal Str is timely controlled in accordance with shutter speed so as to cause the light emission of the strobe 9 to peak within charge accumulation time in an image pick-up device 12.

In the embodiment above, a change of illumination intensity on object with a change of shutter speed is focused on. Meanwhile, even in a case that illumination intensity itself is changed within a range of strobe light emission effect, the image picked-up signal level outputted from the AGC amplifier 19a may remain constant by controlling an amount of light emission of the strobe 9 in accordance with the control signal Sgc to the AGC amplifier 19a.

Figure 11:
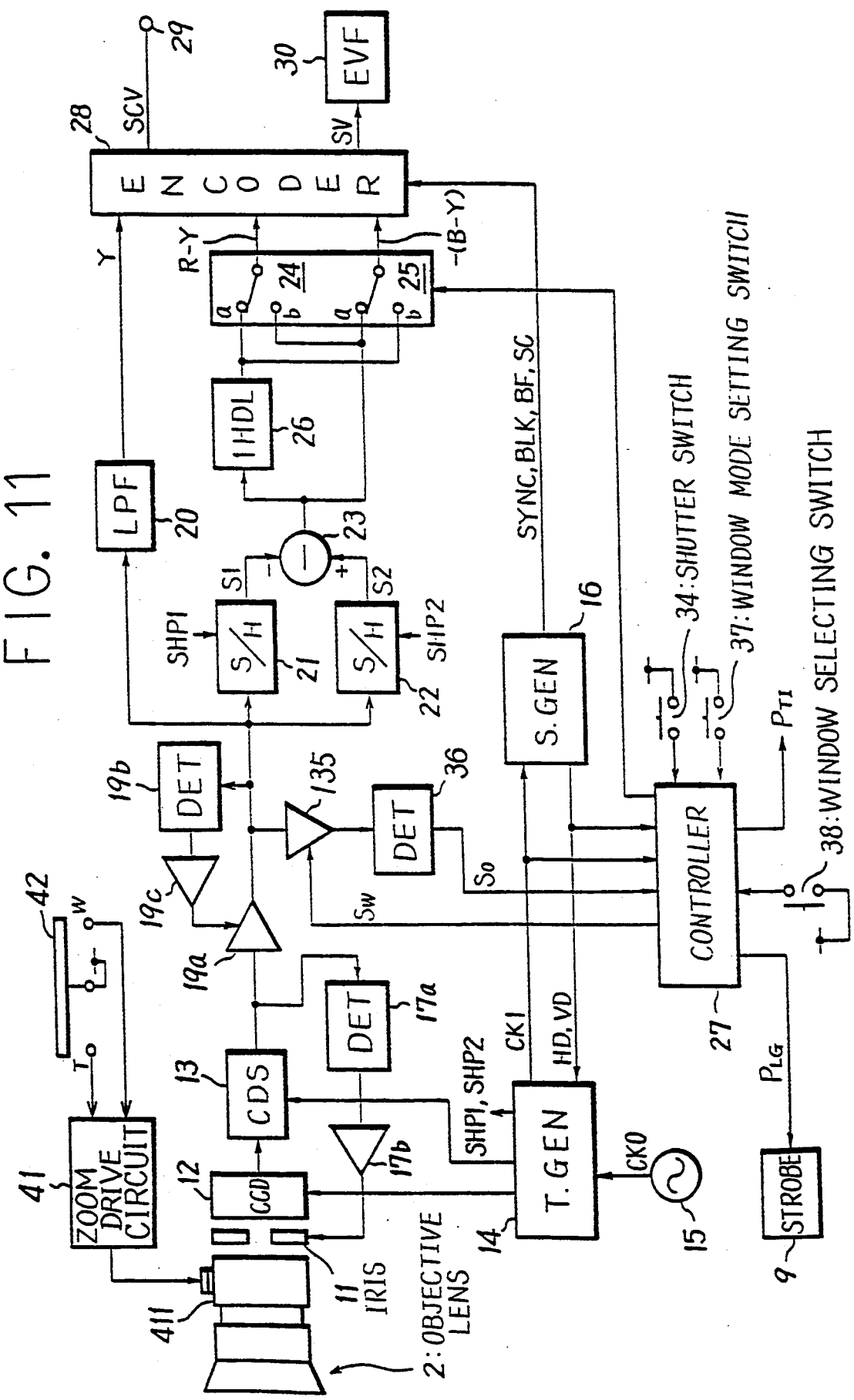
FIG. 11 is a schematic block diagram of another video camera section.

Now, a another embodiment of the present invention will be described with reference to the drawings. FIG. 11 is a schematic block diagram of the video camera section of this embodiment. In FIG. 11, parts in common with the representation in FIG. 2 are designated with the same reference numerals, and they are not described in detail any further.

In this embodiment, the output signal of an AGC amplifier 19a is supplied through a attenuator 35 to a level detector 36, whose output signal is next supplied to controller 27.

To the controller 27 is connected a window mode setting switch 37, a window selecting switch 38 and a shutter switch 34.

With turning on the window mode setting switch 37, window mode is set up. In window mode, by the window selecting switch on, one window pattern is selected between multiple window patterns, which correspond to respective areas predetermined in a screen.

In window mode, a window signal Sw corresponding to a window pattern selected is outputted from the controller 27 and supplied as a control signal to the attenuator 35. Shown at A through at D in FIG. 12 are examples of window patterns. A in the Figure represents a window pattern of a whole screen 100, the level of the window signal Sw corresponding to the window pattern of a whole screen 100 is determined to be 5 volts. Although B in the Figure represents also a window pattern of a whole screen 100, the level of the window signal Sw is provided so as to continuously change from 0 volt to 5 volts at the upper half of the vertical of the screen. C in the Figure represents a window pattern of the centre area of the screen 100 (shown by a dashed line), and the level of the window signal Sw is partially 5 volts, corresponding to the centre area. D in the Figure represents a window pattern of two areas of the screen 100 (shown by dashed lines), and the level of the signal is partially 5 volts, corresponding to the two parts of the horizontal of the screen.

Figure 13:
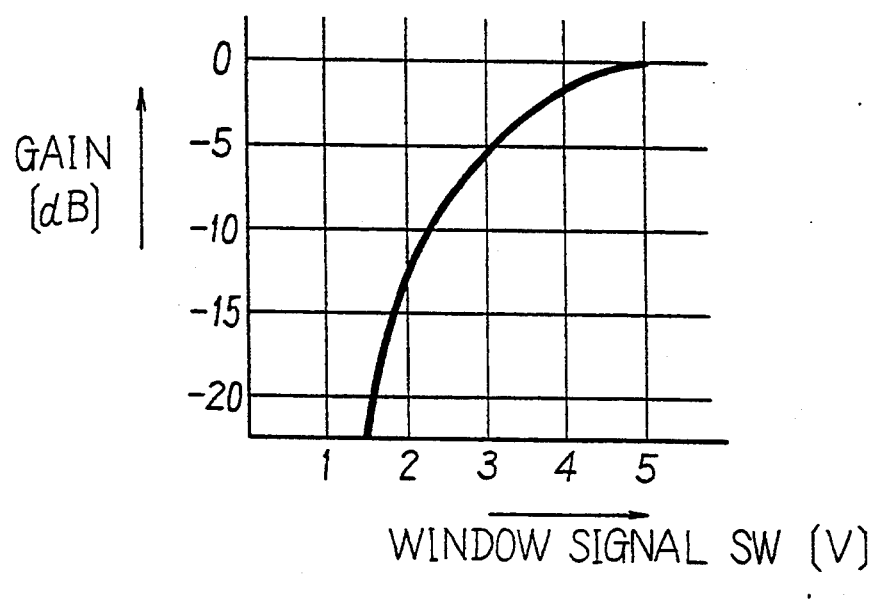
FIG. 13 is a graph showing a gain characteristic curve of an attenuator.

FIG. 13 represents a gain characteristic curve of a attenuator 35, whose gain is shown to be 0 dB when the level of a window signal Sw is 5 volts. Because the level of window signal Sw is given 5 volts corresponding to a whole screen 100, in no window mode with a window mode setting switch off, it is the same effect as in a case the attenuator 35 is not provided.

Meanwhile, light emission of a strobe 9 is controlled by the controller 27: that is, if the level of the output signal So from the level detector 36 exceeds a threshold value Vth of strobe light emission when a shutter switch 34 is turned on, a strobe light emission pulse PLG is supplied from the controller 27 to the strobe 9 so as to cause the strobe 9 to effect light emission in the next vertical scan period after the shutter switch 34 is turned on, whether in window mode or not.

Figure 14:
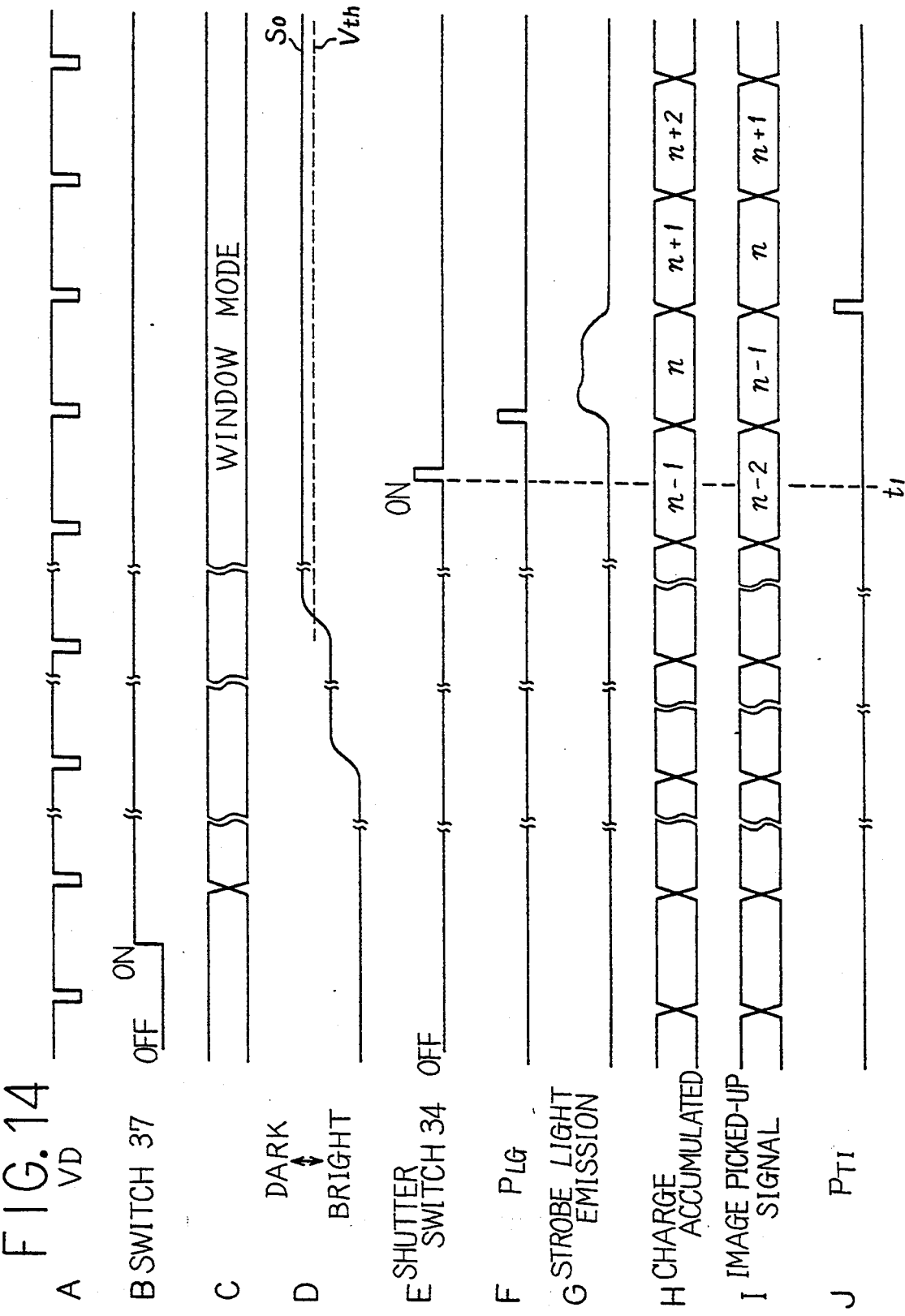
FIG. 14 is a waveform chart showing an operation of strobe light emission in window mode.

In the above construction, when a window mode setting switch 37 is turned on (as shown at B in FIG. 14), window mode is set up in synchronization with the next vertical sync signal VD (as shown at C in FIG. 14). Shown at A in FIG. 14 is the vertical sync signal VD.

In window mode, a window pattern corresponding to a particular object intended to be picked up can be selected by operating a window selecting switch 38. At the same time, a window signal Sw corresponding to the window pattern selected is outputted from a controller 27 and supplied as a control signal to an attenuator 35, in which a particular image picked-up signal corresponding to the window pattern selected is taken from the output signal of an AGC amplifier 19a, and next supplied to a level detector 36. Accordingly, the level of output signal So of the level detector 36 varies depending on the window pattern selected. Consequently, the level of the window signal Sw is to represent the illumination intensity on the particular object intended to be picked up if the window pattern is selected so as to correspond to the particular object.

Suppose the level of the signal So is represented by a solid line shown at D in FIG. 14; since the level of the signal So exceeds a threshold value Vth of strobe light emission when a shutter switch 34 is turned on (as shown at E in FIG. 14), a strobe light emission pulse PLG is supplied (as shown at F in FIG. 14) from the controller 27 to a strobe 9 in synchronization with the next vertical sync signal VD so as to cause the strobe 9 to effect light emission in the next vertical scan period (as shown at G in FIG. 14) after the shutter switch 34 is turned on.

H in FIG. 14 represents a charge accumulated in an image pick-up device 12, while I in FIG. 14 represents an image picked-up signal from the image pick-up device 12, which is outputted with a delay of one vertical scan period.

J in FIG. 14 represents a take-in pulse PTI outputted from the controller 27. By mean of this take-in pulse PTI, one frame (one vertical scan period) image picked-up signal n picked up with light emission of a strobe 9 (refer to I in FIG. 14) can be latched into, for instance, a still image recorder connected to an output terminal 29.

Incidentally, regarding the above descriptions of the timing when a strobe light emission pulse PLG or a take-in pulse PTI is generated in window mode, the same is true of the case in no window mode with a window mode setting switch 37 off; details are not described, however.

In this embodiment as described above, when in window mode a window pattern is selected so as to correspond to an intended object to be picked up, the level of an output signal So of a level detector 36 is to represent illumination intensity on the intended object. Accordingly, the object may be picked up with a sufficient amount of light since light emission of a strobe 9 is controlled in accordance with the signal So.

For example, in a case where a person or thing in a back light is to be picked up, illumination intensity on the person or thing in the centre of the screen may be increased and hence a back light compensation may be made, by selecting a window pattern as shown at C in FIG. 12. At that time, strobe light emission does not excessively brighten the background and hence does not cause what you call white-saturation if the background objects are relatively at a distance from the intended object in the centre of the screen.

Although not described above, it may be thought that a window pattern selected in window mode is displayed on a viewfinder 30. In that case, a signal representing the window pattern selected is produced and is combined with a monochrome video signal SV. Referring to a window pattern displayed on the viewfinder 30 permits easy selection of a window pattern suitable for an intended object to be picked up.

In the embodiment above, a pick-up operation of a still picture is described as an example. Meanwhile, in a case of a photo-camera as well, an intended object may be picked up with a sufficient amount of light by selecting a window pattern suitable for the intended object.

Figure 15:
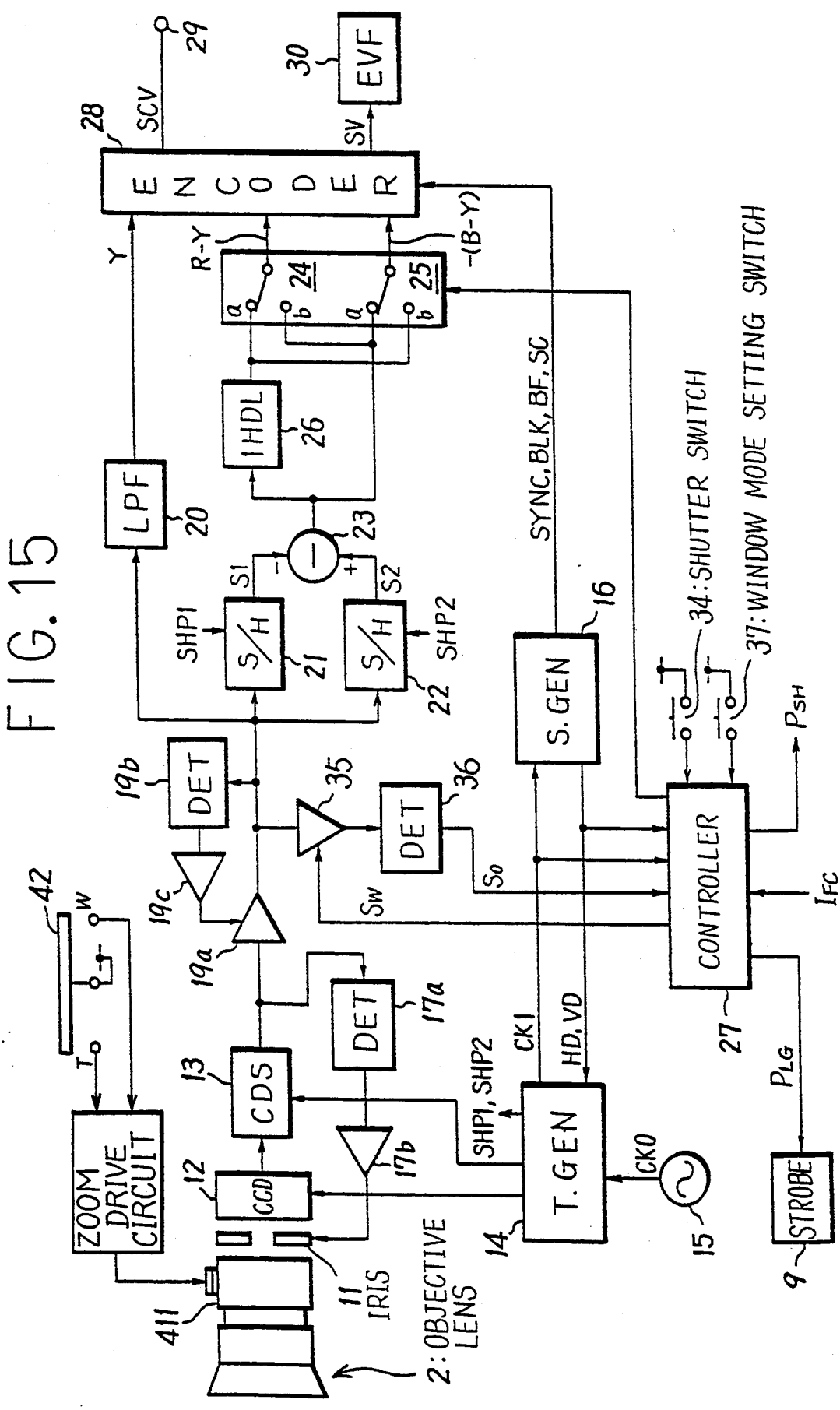
FIG. 15 is a schematic block diagram of a further video camera section.

Now, another embodiment of the present invention will be described with reference to the drawings. FIG. 15 is a schematic block diagram of the video camera section of this embodiment. In FIG. 15, parts in common with the representation in FIG. 2 or in FIG. 11 are designated with the same reference numerals, and they are not described in detail any further.

In this embodiment, to controller 27 is supplied focus information IFC from a focus system of a photo-camera section (not shown in Figure), and the focus is not controlled continuously but consecutively through a series of several stages.

By turning on a window mode setting switch 37, window mode is set up. In the window mode, in accordance with focus information IFC one window pattern is automatically selected between multiple window patterns, which corresponds to respective areas predetermined in a screen. In other words, by bringing an intended object to be picked up into focus, one window pattern corresponding to the intended object is selected. In window mode, a window signal Sw corresponding to the window pattern selected is outputted from the controller 27 and supplied as a control signal to an attenuator 35.

Shown at A and B in FIG. 16 are examples of window patterns. Their respective window patterns of the areas shown by dashed lines on a screen 100 are automatically selected, when the intended object to be picked up, which is as shown in the Figure, is brought into focus. And the level of the window signals Sw corresponding to the areas shown by dashed lines are determined to be 5 volts.

As described above, the gain of the attenuator 35 is 0 dB when the level of a window signal Sw is 5 volts. In no window mode with a window mode setting switch off, it is the same effect as in a case the attenuator 35 is not provided, because the level of the window signal Sw is fixed to be 5 volts corresponding to a whole screen 100.

Meanwhile, light emission of a strobe 9 is controlled by a controller 27: that is, if the level of the output signal So from the level detector 36 exceeds a threshold value Vth of strobe light emission when a shutter switch 34 is turned on, a strobe light emission pulse PLG is supplied from the controller 27 to the strobe 9 so as to cause the strobe 9 to effect light emission in the next vertical scan period after the shutter switch 34 is turned on, whether in window mode or not.

Figure 17:
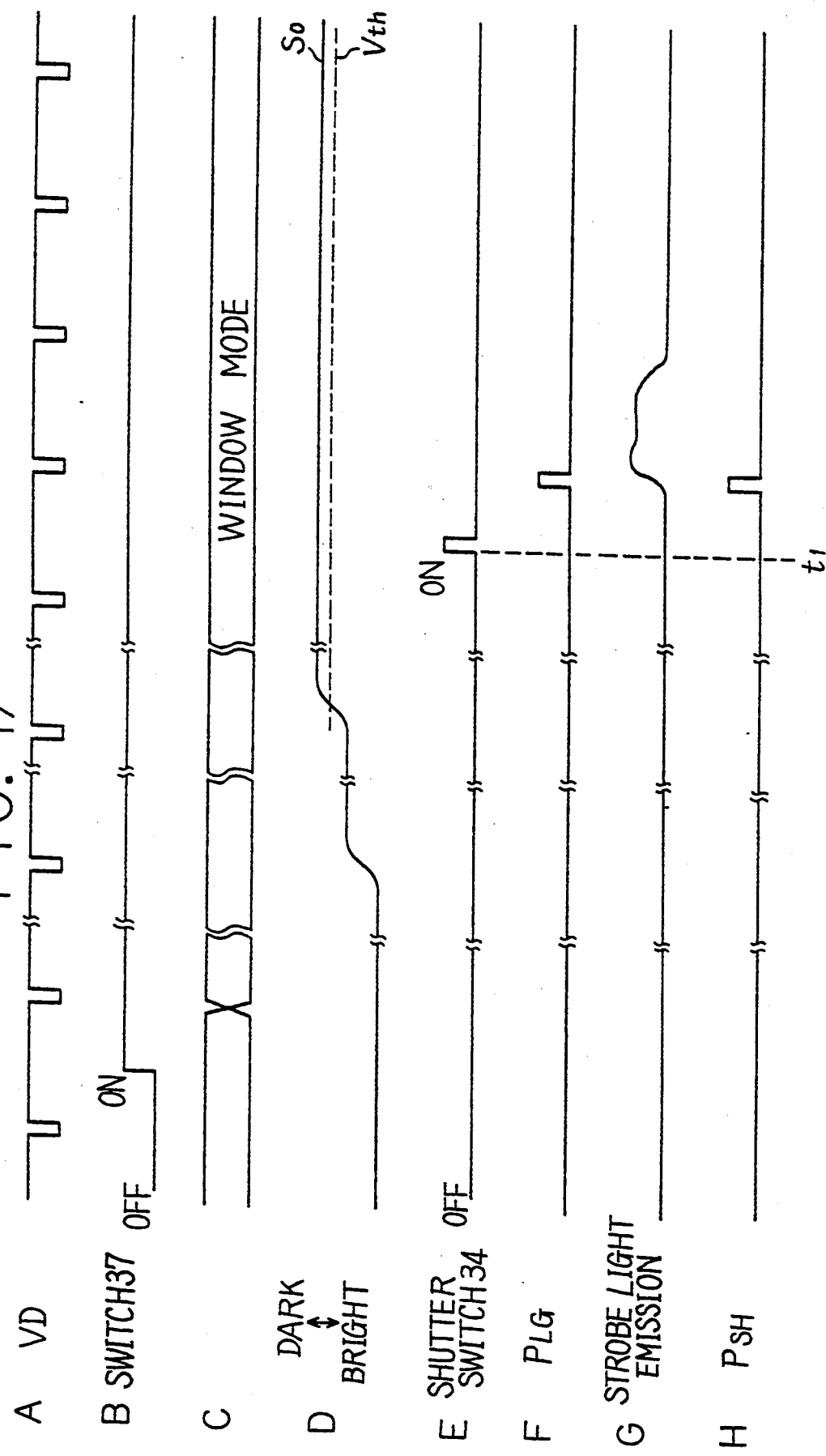
FIG. 17 is a waveform chart showing another operation of strobe light emission in window mode.

In the above construction, when a window mode setting switch 37 is turned on (as shown at B in FIG. 17), window mode is set up in synchronization with the next vertical sync signal VD (as shown at C in FIG. 17). Shown at A in FIG. 17 is the vertical sync signal VD.

In window mode, when an intended object to be picked up is brought into focus, one window pattern corresponding to the intended object is automatically selected in accordance with focus information IFC.

At the same time, a window signal Sw corresponding to the window pattern selected is outputted from a controller 27 and supplied as a control signal to a attenuator 35, in which a particular image picked-up signal corresponding to the window pattern selected is taken from the output signal of an AGC amplifier 19a and supplied to a level detector 36. Accordingly, the level of the output signal So of the level detector 36 represents the illumination intensity on the intended object being in focus to be picked up.

Suppose the level of the signal So is represented by a solid line shown at D in FIG. 17; since the level of the signal So exceeds a threshold value Vth of strobe light emission when a shutter switch 34 is turned on at t1 (as shown at E in FIG. 17), a strobe light emission pulse PLG is supplied (as shown at F in FIG. 17) from the controller 27 to a strobe 9 in synchronization with the next vertical sync signal VD so as to cause the strobe 9 to effect light emission (as shown at G in FIG. 17) in the next vertical scan period after the shutter switch 34 is turned on.

Shown at H in FIG. 17 is a shutter pulse PSH supplied to a mechanical shutter (although not shown) of a photo-camera section, so that an image is to be picked up with the mechanical shutter open in response to light emission of a strobe 9.

Incidentally, regarding the above descriptions of the timing at the time when a strobe light emission pulse PLG or a shutter pulse PSH is generated in window mode, the same is true of a case in no window mode with a window mode setting switch 37 off; details are not described, however.

Thus, in this embodiment, a window pattern corresponding to an intended object is automatically selected in accordance with focus information IFC when the intended object is brought into focus in window mode. Accordingly, the level of the output signal So of a level detector 36 is to represent illumination intensity on the intended object. Consequently, in a photo-camera section, the intended object may be picked up with a sufficient amount of light since light emission of a strobe 9 is controlled in accordance with the output signal So. For example, also in a case where a person or thing in a back light is to be picked up, merely bringing the intended object into focus enables a back light compensation to be made in such a way that illumination intensity on the intended object is increased by light emission of the strobe 9.

Although not described above, it may be thought that a window pattern selected in window mode is displayed on a viewfinder 30. In that case, a signal representing the window pattern is produced and combined with a monochrome video signal SV. Displaying a window pattern on the viewfinder 30 permits easily monitoring an intended object to be picked up.

Figure 18:
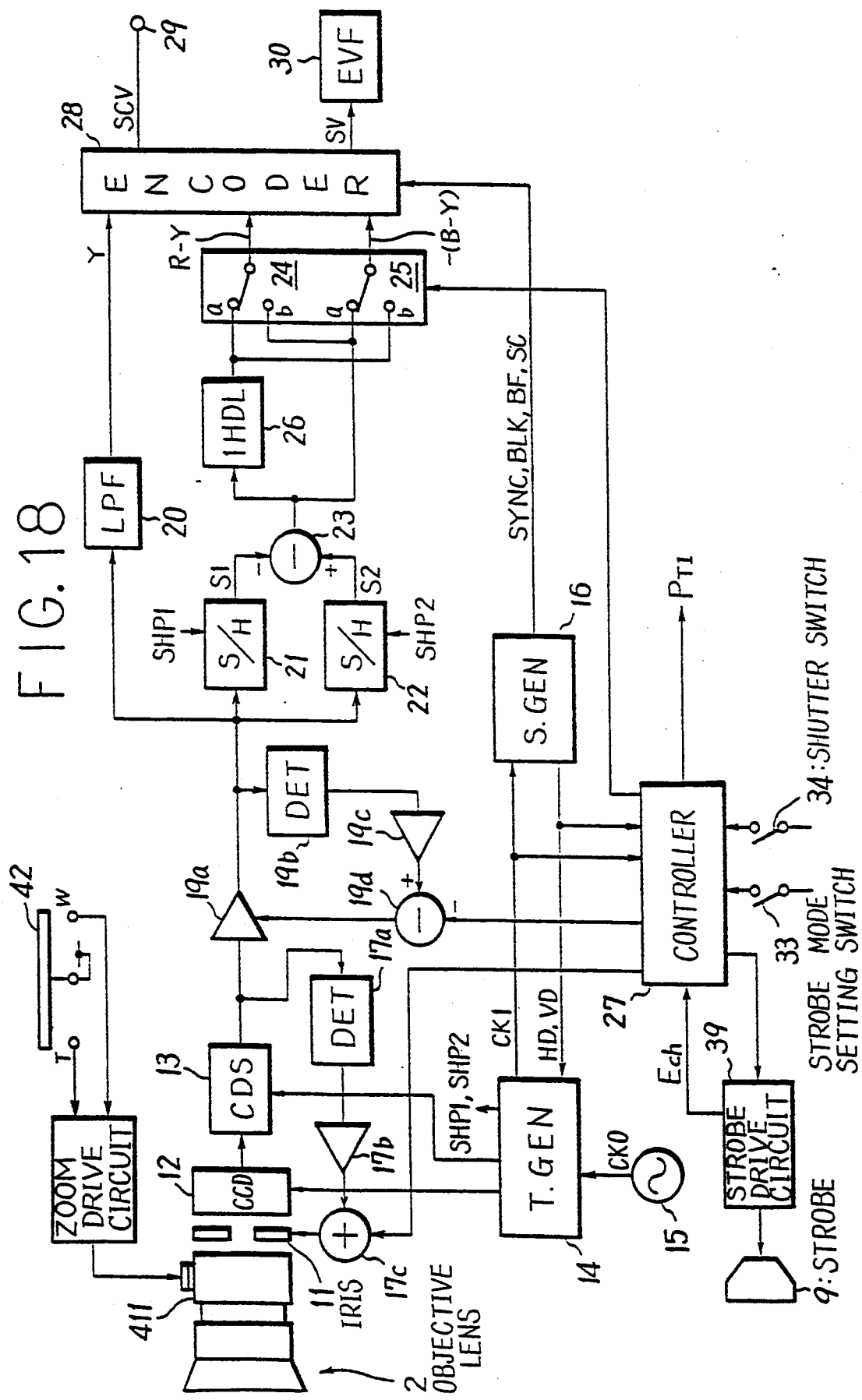
FIG. 18 is a schematic block diagram of a still further video camera section.

Now, another embodiment of the present invention will be described with reference to the drawings. FIG. 18 is a schematic block diagram of the video camera section of this embodiment. In FIG. 18, parts in common with the representation in FIG. 2 are designated with the same reference numerals, and they are not described in detail any further.

In this embodiment, an image picked-up signal outputted from the CDS circuit 13 is supplied to a level detector 17a, which detects the level of the image picked-up signal and whose output signal is next transmitted as a control signal through an iris drive circuit 17b and followed by an adder 17c to an iris 11, so as to effect automatic control of the stop of the iris 11.

Figure 19:
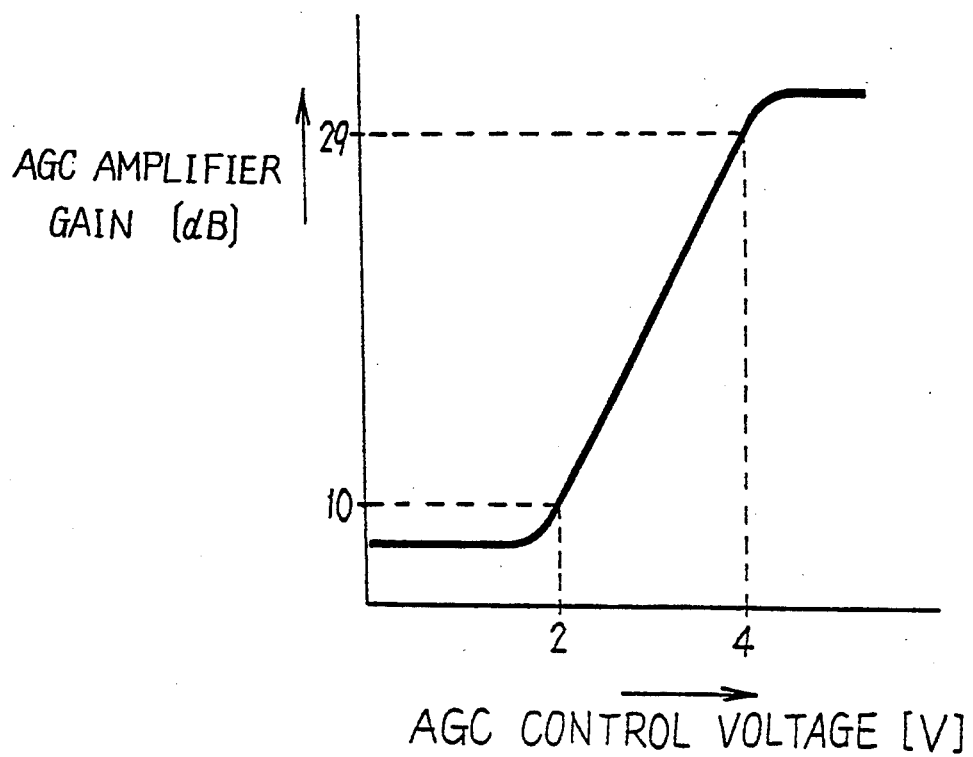
FIG. 19 is a graph showing a gain control characteristic curve of an AGC amplifier.

On the other hand, the output signal of a level detector 19b which detects the level of the output signal of an AGC amplifier 19a is transmitted as a control signal through a buffer 19c and followed by a subtractor 19d back to the AGC amplifier 19a. The control voltage varies in a range between, for instance, 2 and 4V for corresponding variations of the gain of the AGC amplifier 19a in a range between 10 and 29 dB, as shown in FIG. 19. While the iris 11 is operative, the control voltage is held constant at 2V.

A strobe mode setting switch 33 is connected to a controller 27. By turning on the switch 33, strobe mode is set up turning from normal mode. In strobe mode, an strobe drive circuit 39 becomes operative so as to start charging a capacitor in it (not shown in Figure).

If charge voltage Ech exceeds a threshold value Eth for strobe light emission when a shutter switch 34 is turned on, a strobe 9 is controlled so as to effect light emission in the next field.

Charging voltage Ech in the strobe drive circuit 39 is monitored by a controller 27: in strobe mode, when the charge voltage Ech exceeds a threshold value Eth, a control signal is supplied from the controller 27 to an adder 17c so as to control an aperture of an iris 11 to be reduced to, for example, about ⅓. That aperture size of the iris 11 is, unless strobe mode is cancelled, still kept the same until a time when light emission of the strobe 9 is effected in a certain field.

When the aperture of the iris 11 is reduced, gain of an AGC amplifier 19a is forcibly decreased with a delay of one vertical scan period. At that time, a control signal is supplied from the controller 27 to the subtractor 19d, so that a control voltage to the AGC amplifier 19a is fixed at, for example, 2 volts Incidentally, in strobe mode, the controller 27 outputs a take-in pulse PTI in synchronization with the end of the field in which light emission of a strobe 9 is effected. The take-in pulse PTI is used to latch into one frame (one vertical scan period) data in a still image recorder (although not shown) connected to an output terminal 29.

Figure 20:
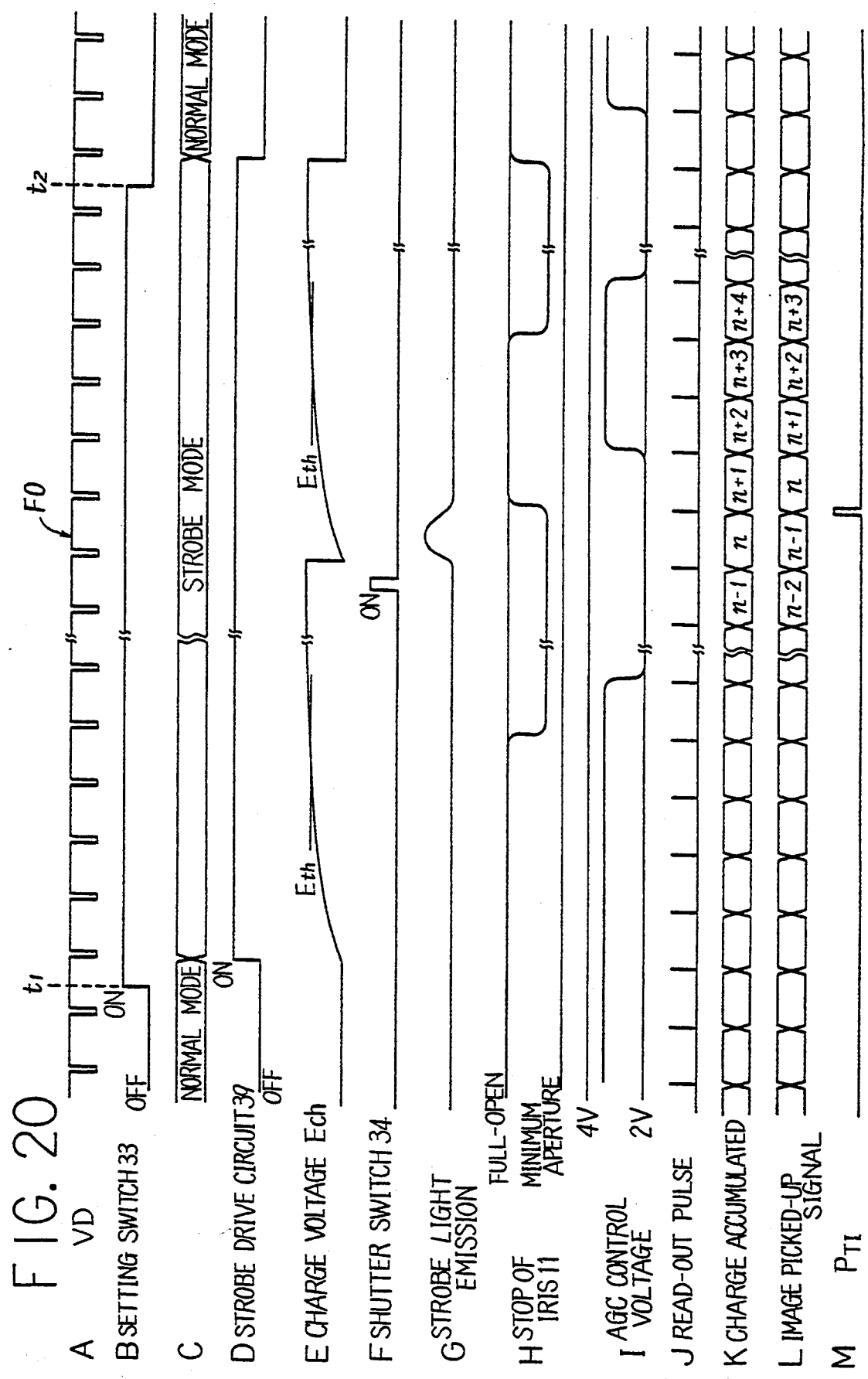
FIG. 20 is a waveform chart showing another operations in strobe mode.

In the above construction, when the strobe mode setting switch 33 is turned on at t1 (as shown at B in FIG. 20), strobe mode is set up turning from normal mode in synchronization with the next vertical sync signal VD (as shown at C in FIG. 20). Shown at A in FIG. 20 is the vertical sync signal VD.

When strobe mode is set up, a strobe drive circuit 39 is turned on (as shown at D in FIG. 20) so as to gradually increase charge voltage Bch (as shown at B in FIG. 20). If the charge voltage Ech exceeds a threshold value Eth for strobe light emission, the aperture of an iris 11 is reduced in synchronization with the next vertical sync signal VD (as shown at H in FIG. 20).

Figure 21:
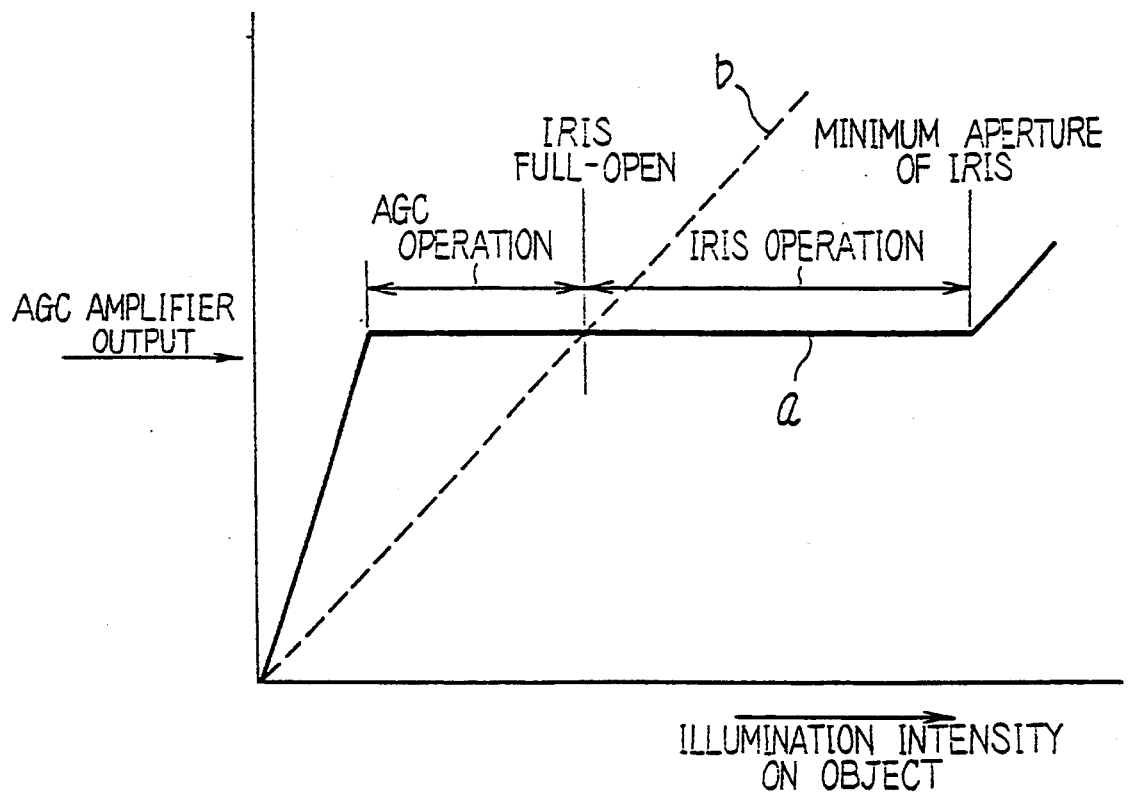
FIG. 21 is a graphical representation, showing the relation between illumination intensity on object and AGC amplifier output, in normal mode.

Incidentally, FIG. 20 shows an example of the process in which strobe mode is set in the condition of low illumination intensity and the iris 11 full-open with AGC (automatic gain control) operative. The solid line a in FIG. 21 represents the relationship in normal mode, between illumination intensity on object and output of an AGC amplifier 19a, and the dashed line b represents the relationship between them in a case that the gain of the AGC amplifier 19a is fixed at the value of 10 dB when the iris 11 is full-open.

With a delay of one vertical scan period after the aperture of the iris 11 is reduced, a control voltage to the AGC amplifier 19a is set to be 2 volts (as shown at I in FIG. 20) and the gain of the AGC amplifier 19a is fixed at 10 dB.

Thereafter, with a shutter switch 34 being turned on, the strobe drive circuit 39 is controlled by controller 27 so as to cause the strobe 9 to effect light emission in the next vertical scan period (as shown at G in FIG. 20).

After light emission of the strobe 9 is effected in a certain vertical scan period, the aperture of the iris 11 is restored to its original size in the next vertical scan period (as shown at H in FIG. 20), and afterwards the control voltage to the AGC amplifier 19a is also restored to its original level with a delay of one vertical scan period (as shown at I in FIG. 20).

When the strobe 9 starts to emit light, the charge voltage Ech of a capacitor in the strobe drive circuit 39 is suddenly decreased; while the voltage Ech is gradually increased again, afterwards (as shown at B in FIG. 20). When the charge voltage Ech exceeds the threshold value Eth, the aperture of the iris 11 is reduced again (as shown at H in FIG. 20). Thereafter the gain of an AGC amplifier 19a is forcibly decreased with a delay of one vertical scan period (as shown at I in FIG. 20).

In this situation, if the strobe mode setting switch 33 is turned off at t2 (as shown at B in FIG. 20), normal mode is set up turning from strobe mode in synchronization with the next vertical sync signal VD (as shown at C in FIG. 20). When normal mode is set up, the strobe drive circuit 39 becomes no operative so as to suddenly decrease charge voltage Ech (as shown at E in FIG. 20). Further, the aperture of the iris 11 and afterwards the control voltage to the AGC amplifier 19a are restored to their original states (as shown at H and I in FIG. 20).

Incidentally, a read pulse is supplied from a timing generator 14 to an image pick-up device 12 at the end of each vertical scan period (as shown at J in FIG. 20). Therefore, a charge accumulated in the image pick-up device 12 is formed as shown at K in FIG. 20. On the other hand, an image picked-up signal from the image pick-up device 12 is outputted with a delay of one vertical scan period, as shown at L in FIG. 20.

Meanwhile, a take-in pulse PTI is outputted from a controller 27 in synchronization with the end of the field Fo during which light emission of a strobe 9 is effected (as shown at M in FIG. 20). By mean of this take-in pulse PTI, one frame (one vertical scan period)

image picked-up signal n picked up with light emission of the strobo 9 can be latched into, for instance, in a still image recorder connected to an output terminal 29.

The image picked-up signal n obtained under the condition with a sufficient amount of object light is of high quality of a high signal-to-noise ratio, compared with image picked-up signals in other fields, which are level-compensated in an AGC amplifier 19a.

Thus in this embodiment, when charge voltage Ech exceeds a threshold value Eth for strobe light emission, in strobe mode; the aperture of an iris 11 is reduced and afterwards a control voltage to an AGC amplifier 19a is fixed at 2 volts, so that the level of an image picked-up signal outputted from the AGC amplifier 19a is decreased. For that reason, an image displayed on a viewfinder 30 is made dark so that the condition for light emission of a strobe 9 may easily be checked with a view of the image. Consequently, strobe light emission may certainly be carried out when a shutter button 7 (shutter switch 34) is depressed.

In strobe mode, because the aperture of an iris 11 is reduced When charge voltage Ech exceeds a threshold value Eth for strobe light emission, a great amount of light due to strobe light emission is not incident on an image pick-up device 12. Accordingly, saturation of the charge accumulation can be prevented.

Figure 22:
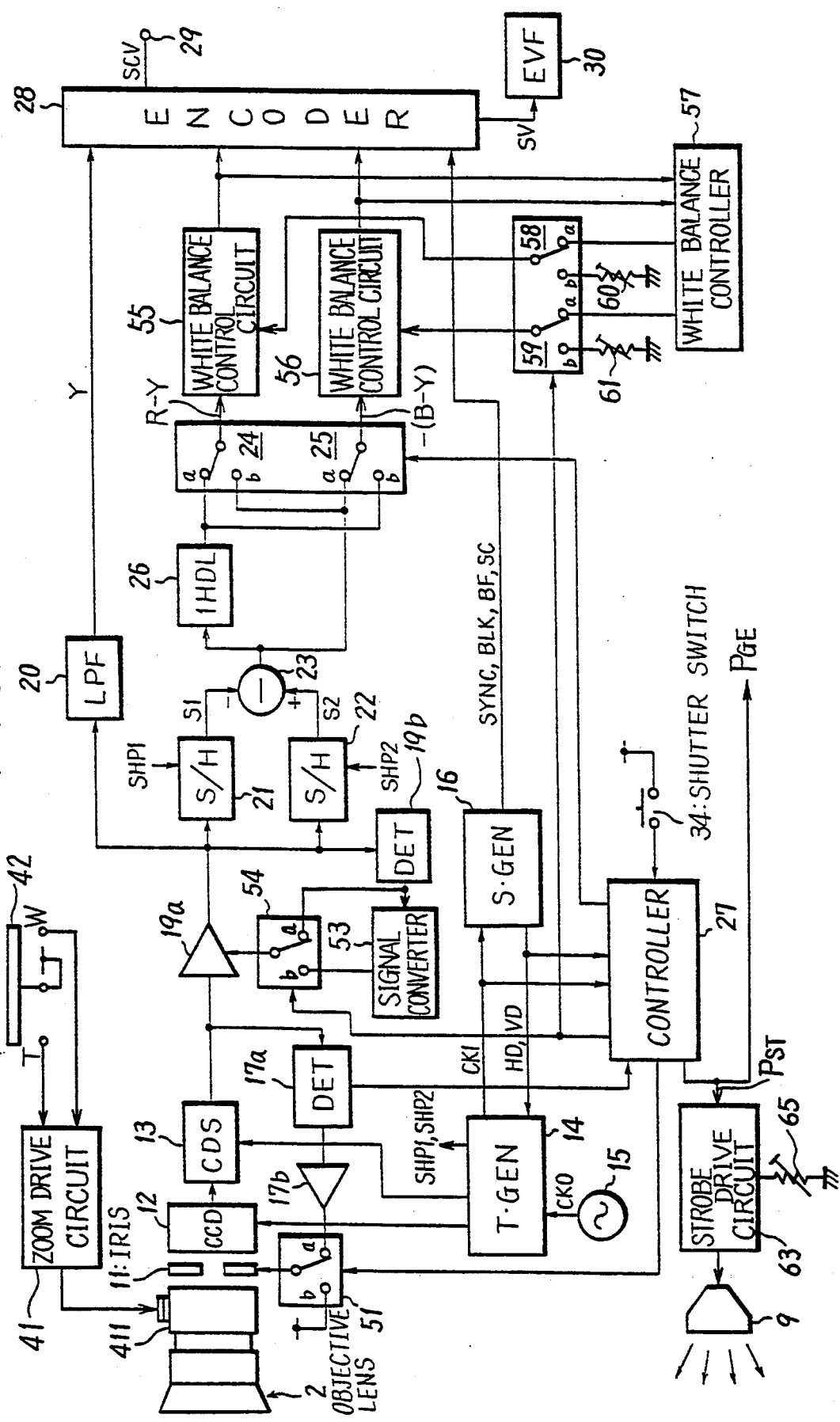
FIG. 22 is a schematic block diagram of a yet further video camera section.

Now, another embodiment of the present invention will be described with reference to the drawings. FIG. 22 is a schematic block diagram of the video camera section of this embodiment. In FIG. 22, parts in common with the representation in FIG. 2 are designated with the same reference numerals, and they are not described in detail any further.

In this embodiment, a strobe 9 is controlled so as to emit strobe light in response to a depression of a shutter button 7 when illumination intensity on object is below 100lx.

Besides, an output signal of a level detector 17a which detects the level of an image picked-up signal outputted from a CDS circuit 13 is supplied through an iris drive circuit 17b to the fixed contact on a side of a selecting switch 51, while the fixed contact on b side of the switch 51 is connected to power supply.

Switching of a connection in the selecting switch 51 is controlled by a controller 27. More in detail, a connection in the switch is made on a side of the contacts in no particular periods, while made on b side of the contacts during the vertical scan period of strobe light emission and the next vertical scan period, as described later. To the controller 27 are supplied a horizontal sync signal HD and a vertical sync signal VD as a reference sync signal from a sync signal generator 16, and is also supplied a clock CK1 from a timing pulse generator 14.

The output signal of the selecting switch 51 is supplied as a control signal to an iris 11. While a connection in the selecting switch 51 is made on a side; the stop of the iris 11 is controlled in accordance with the output signal of a level detector 17a, and in this case, the iris 11 is full-opened when illumination intensity is lowered below 100lx. On the other hand, while a connection in the selecting switch 51 is made on b side; the iris 11 is full-opened.

Meanwhile, an image picked-up signal outputted from an AGC amplifier 19a is supplied to a level detector 19b, whose output signal is next supplied through a signal converter 53 to the fixed contact on b side of a selecting switch 54. To the fixed contact on a side of this selecting switch 51 is supplied the output signal of the level detector 19b.

Switching of a connection in the selecting switch 54 is controlled by a controller 27. More in detail, a connection in the selecting switch 54 is made on a side in no particular periods, while made on b side during the next vertical scan period after strobe light emission, as described later. The output signal of the selecting switch 54 is supplied as a control signal to the AGC amplifier 19a.

Figure 23:
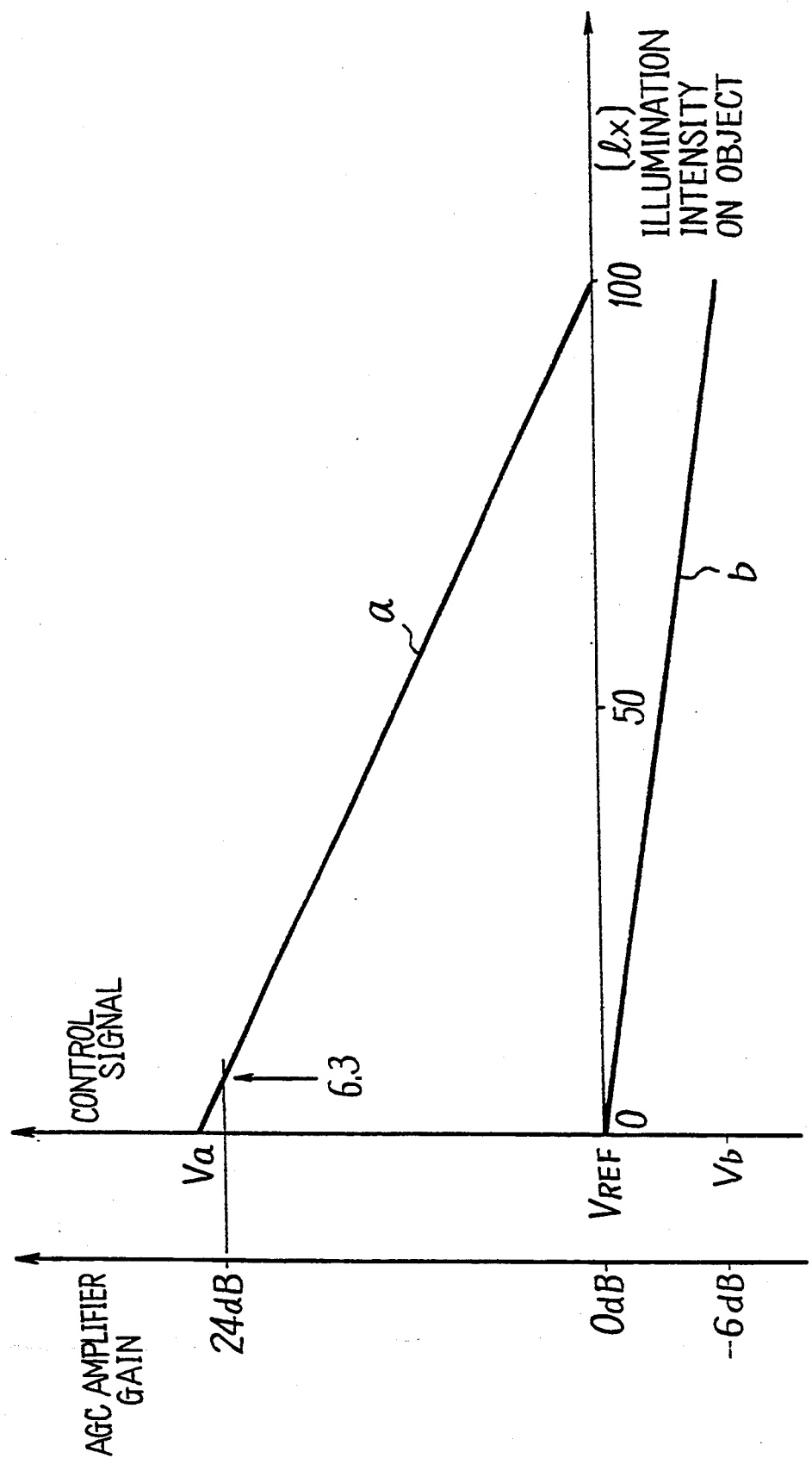
FIG. 23 is a graph for explaining an operation of an AGC amplifier.

Gain of the AGC amplifier 19a is controlled in a range between 24 dB and −6 dB. When illumination intensity on object changes from 0lx to 100lx; the output signal of a level detector 19b is designed to change from voltage Va to Vref (if Va is greater than Vref) as shown by the solid line a in FIG. 23, and at the same time the output signal of a signal converter 53 is designed to change from voltage Vref to voltage Vb (if Vref is greater than Vb). Accordingly, the gain of the AGC amplifier 19a varies between 24 dB and 0 dB with a connection of the selecting switch 54 being made on a side, while varies between 0 dB and −6 dB with a connection of the selecting switch 54 being made on b side (refer to FIG. 23).

In the meantime, a colour difference signal (R−Y) and −(B−Y) separately outputted from a selecting switch 24 and 25 are respectively supplied through a white balance control circuit 55 and 56 to an encoder 28.

The output signals of the circuit 55 and 56 are supplied to a white balance controller 57. the gain control terminal of the circuit 55 and 56 are separately connected to respective moving contacts of selecting switches 58 and 59, whose fixed contacts on a side are connected to the controller 57 while the fixed contacts on b side are grounded through respective pre-set resistors 60 and 61

Switching of connections in the selecting switch 58 and 59 is controlled by a controller 27. More in detail, connections in the selecting switches 58 and 59 are made on a side in no particular periods, while made on b side during the next vertical scan period after strobe light emission, as described later. When connections in the selecting switches 58 and 59 are made on a side; gains of the circuit 55 and 56 are controlled by the controller 57 in accordance with the output signals of the circuit 55 and 56 so as to control white balance. On the other hand, while connections in the selecting switches 58 and 59 are made on b side; gains of the circuit 55 and 56 are controlled in accordance with preset values of the resistor 60 and 61 so as to control white balance corresponding to colour temperature of, for example, 5200° K.

In the meantime, to a controller 27 is connected a shutter switch 34 and is supplied the output signal of a level detector 17a. If illumination intensity on object is below 100lx when the shutter switch 34 is turned on, a strobe light emission pulse Pst is supplied in synchronization with a vertical sync signal VD from the controller 27 to a strobe drive circuit 63 so as to effect light emission of a strobe 9. At that time, the output signal level of the level detector 17a is lowered from a predetermined value because of the lower illumination intensity on object than 100lx. Consequently, in the controller 27, the illumination intensity on object can be detected to be lower than 100lx by means of the output signal of the level detector 17a.

To a strobe drive circuit 63 is connected a pre-set resistor 65 for adjusting an amount of strobe light emission. Although an instant magnitude of light emission of a strobe 9 varies with time, the amount of strobe light emission is adjusted to such an extent that an illumination intensity of 100lx is constantly provided throughout one vertical scan period. Accordingly, in the vertical scan period when light emission of the strobe 9 is effected, for instance, an original illumination intensity of 0lx on an object increases to an illumination intensity of 100lx, while an original illumination intensity of 100lx on an object increases to an illumination intensity of 200lx.

Incidentally, the strobe light emission pulse PST outputted from the controller 27 also serves as a take-in pulse PGE with which a still video signal is latched into in a still image recorder (not shown in Figure).

Figure 24:
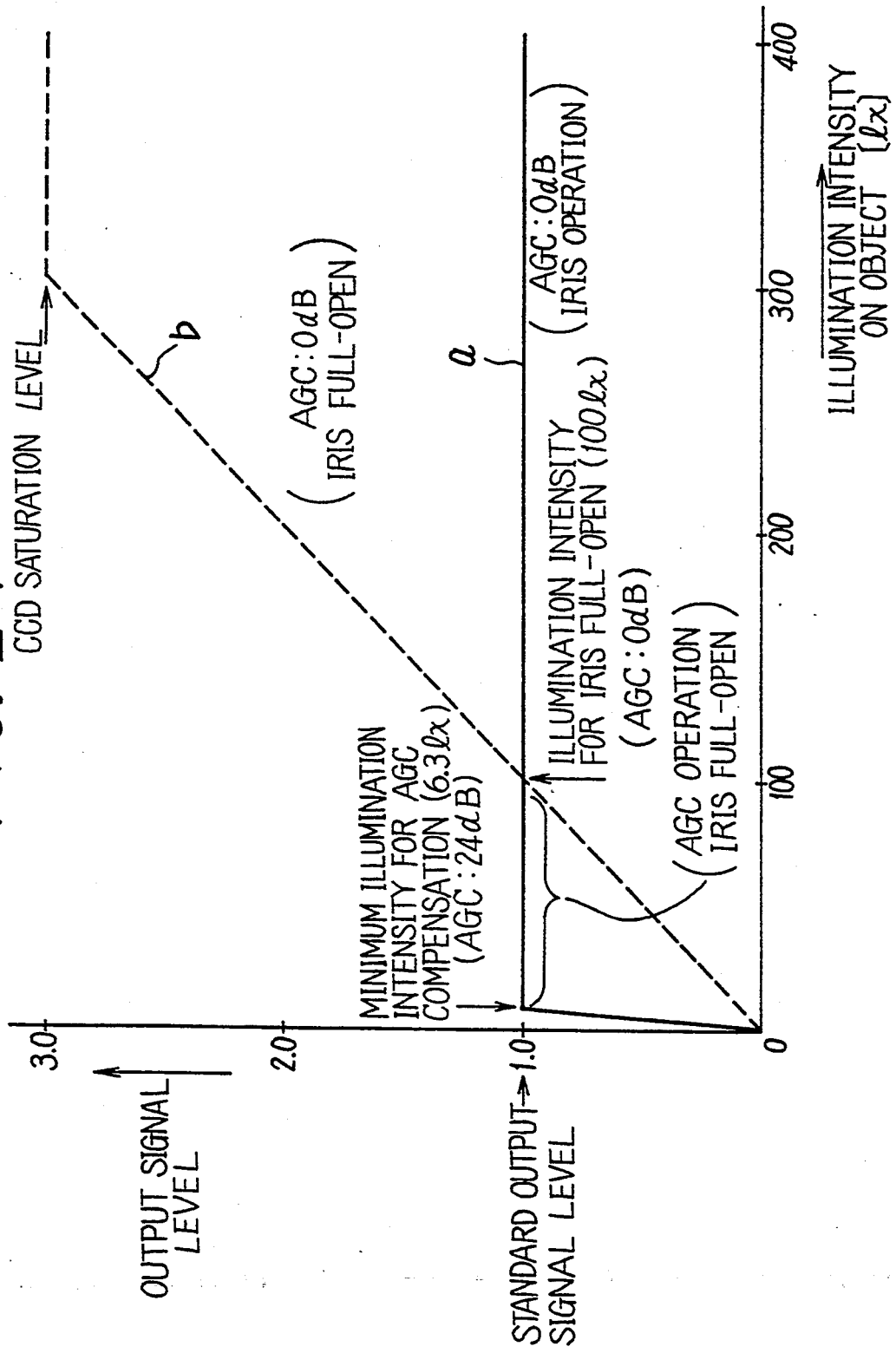
FIG. 24 is a graph for explaining iris operation and AGC operation.

In the above construction, in no particular periods, iris operation and AGC operation are performed in accordance with illumination intensity on object, as is generally well known, since connections in selecting switches 51 and 54 are made on a side. The solid line a in FIG. 24 represents the relation between illumination intensity on object and an output signal level of an AGC amplifier 19a: where standard output signal level is standardized to be 1.0. If illumination intensity on object exceeds 100lx, the output signal level is controlled by iris operation to be at the standard level, while gain of the AGC amplifier 19a is fixed at 0 dB. On the other hand, if illumination intensity on object is below 100lx, the output signal level is controlled by AGC operation to be at the standard level, while the iris 11 is set to be full-open. Incidentally, the dashed line b represents the relation when the gain of the AGC amplifier 19a is 0 dB and the iris 11 is full-open.

Now, the case when a shutter switch 34 is turned on will be described below. If illumination intensity on object is below 100lx when the shutter switch 34 is turned on, a strobe light emission pulse PST (as shown at B in FIG. 25) is supplied in synchronization with a vertical sync signal VD (as shown at A in FIG. 25) from a controller 27 to a strobe drive circuit 63, so as to effect light emission of a strobe 9 (as shown at C in FIG. 25).

A connection in a selecting switch 51 is made on b side (as shown at D in FIG. 25) and an iris 11 is kept full-open, during the vertical scan period of light emission of the strobo 9 and the next vertical scan period.

Figure 25:
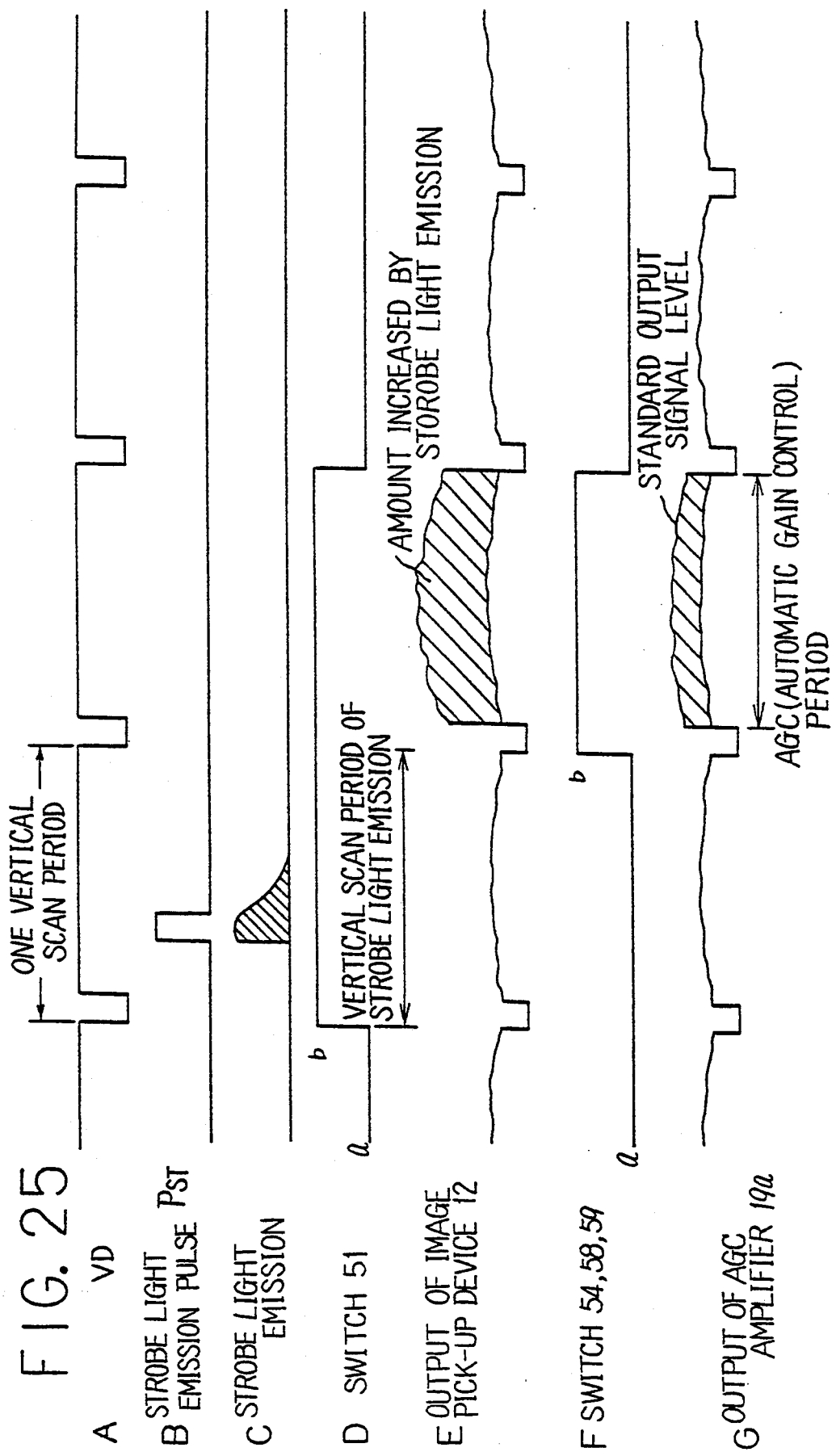
FIG. 25 is a waveform chart for explaining operations in particular periods of strobe light emission.

The image picked-up signal in the vertical scan period of light emission of the strobe 9 is outputted from an image pick-up device 12 in the next vertical scan period. Shown at E in FIG. 25 is an image picked-up signal outputted from the image pick-up device 12, and a hatching part at E in the Figure represents the amount of that increased by light emission of a strobe 9.

Figure 26:
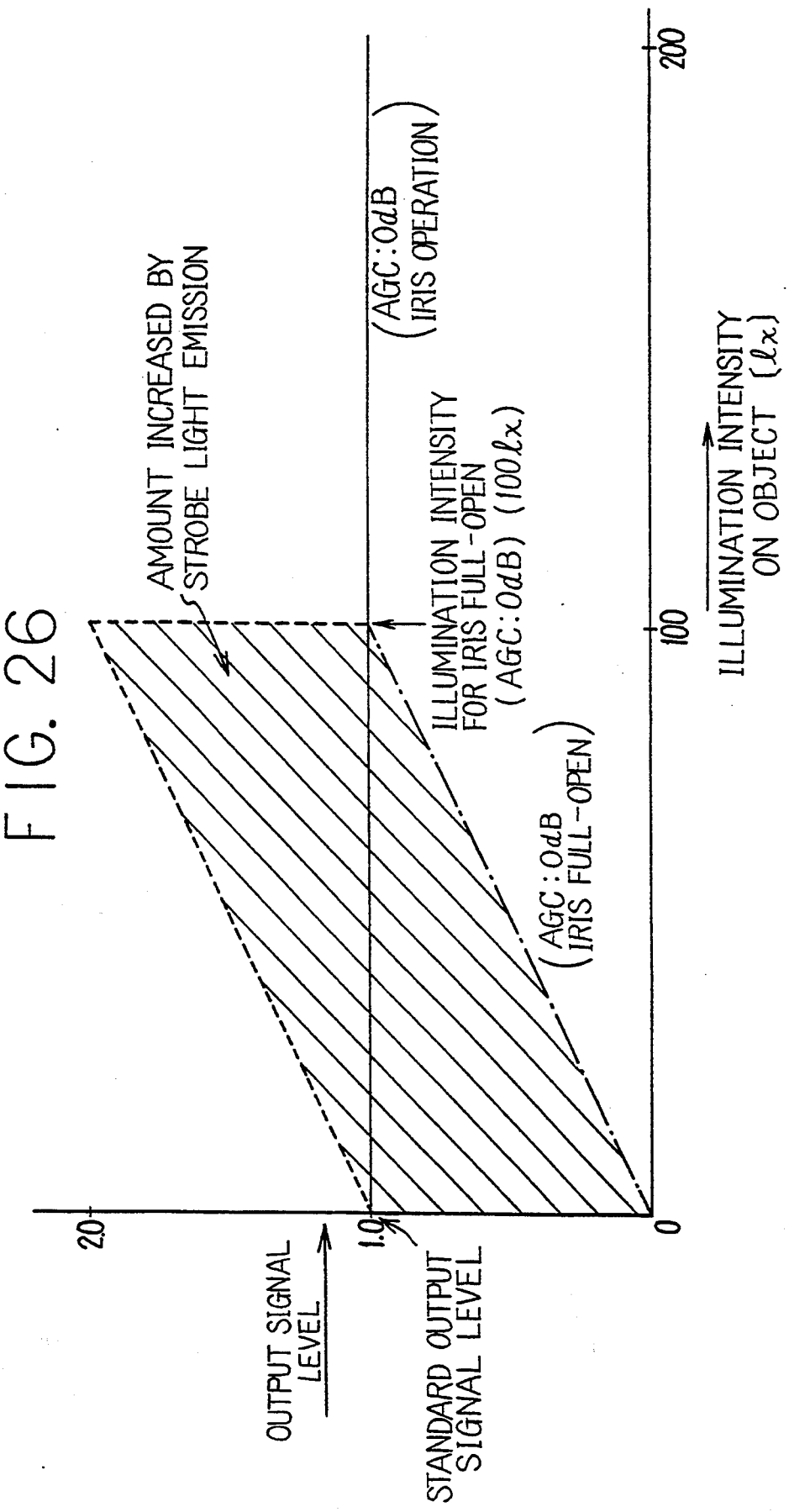
FIG. 26 is a graph for explaining AGC compensation, in which a signal level is compensated by an AGC amplifier, in particular periods of strobe light emission.

The level of the image picked-up signal, which is outputted from the image pick-up device 12 when light emission of the strobe 9 is effected, increases in accordance with illumination intensity on object in a range between 0lx and 100lx, as shown by a hatching part in FIG. 26. For example, the output signal level is equal to the standard output signal level when illumination intensity on object is 0lx, and is twice (6 dB) as high as the standard level when illumination intensity on object is 100lx, in proportion to the illumination intensity on object.

In the next vertical scan period after light emission of the strobe 9 is effected, since a connection in a selecting switch 54 is made on b side (as shown at F in FIG. 25), a control signal that varies in level from Vref to Vb corresponding to illumination intensity from 0lx to 100lx, as described above, is supplied to an AGC amplifier 19a (as shown by the solid line b in FIG. 23), whose gain is controlled in a range from 0 dB to −6 dB. Accordingly, in a range of illumination intensity between 0lx and 100lx, the level of the image picked-up signal outputted from the AGC amplifier 19a is controlled to be the standard output signal level. Shown at G in FIG. 25 is the output signal of the AGC amplifier 19a.

Meanwhile, when connections in selecting switches 58 and 59 are made on b side (as shown at F in FIG. 25) in the next vertical scan period after light emission of a strobe 9 is effected, circuits 55 and 56 control white balance corresponding to colour temperature of a strobe 9. Accordingly, the white balance of an image picked-up signal (afterwards, a colour difference signal) which is outputted from an image pick-up device 12 when light emission of the strobe 9 is effected, is certainly performed.

Thus in this embodiment, by controlling gain of an AGC amplifier 19a in accordance with illumination intensity on object, an image picked-up signal level is to be regulated at the standard output signal level, even if an amount of light mission of a strobe 9 is constant. Therefore, this embodiment is different from a conventional one in which an amount of strobe light emission is controlled in accordance with illumination intensity on object, and may inexpensively be constructed without providing a optical sensor for detecting illumination intensity on object.

In addition, an image picked-up signal which is outputted from an image pick-up device 12 when light emission of a strobe 9 is effected, is simultaneously controlled by circuits 59 and 56, on white balance corresponding to colour temperature of the strobe 9. Accordingly, the white balance control may certainly be performed.

Figure 27:
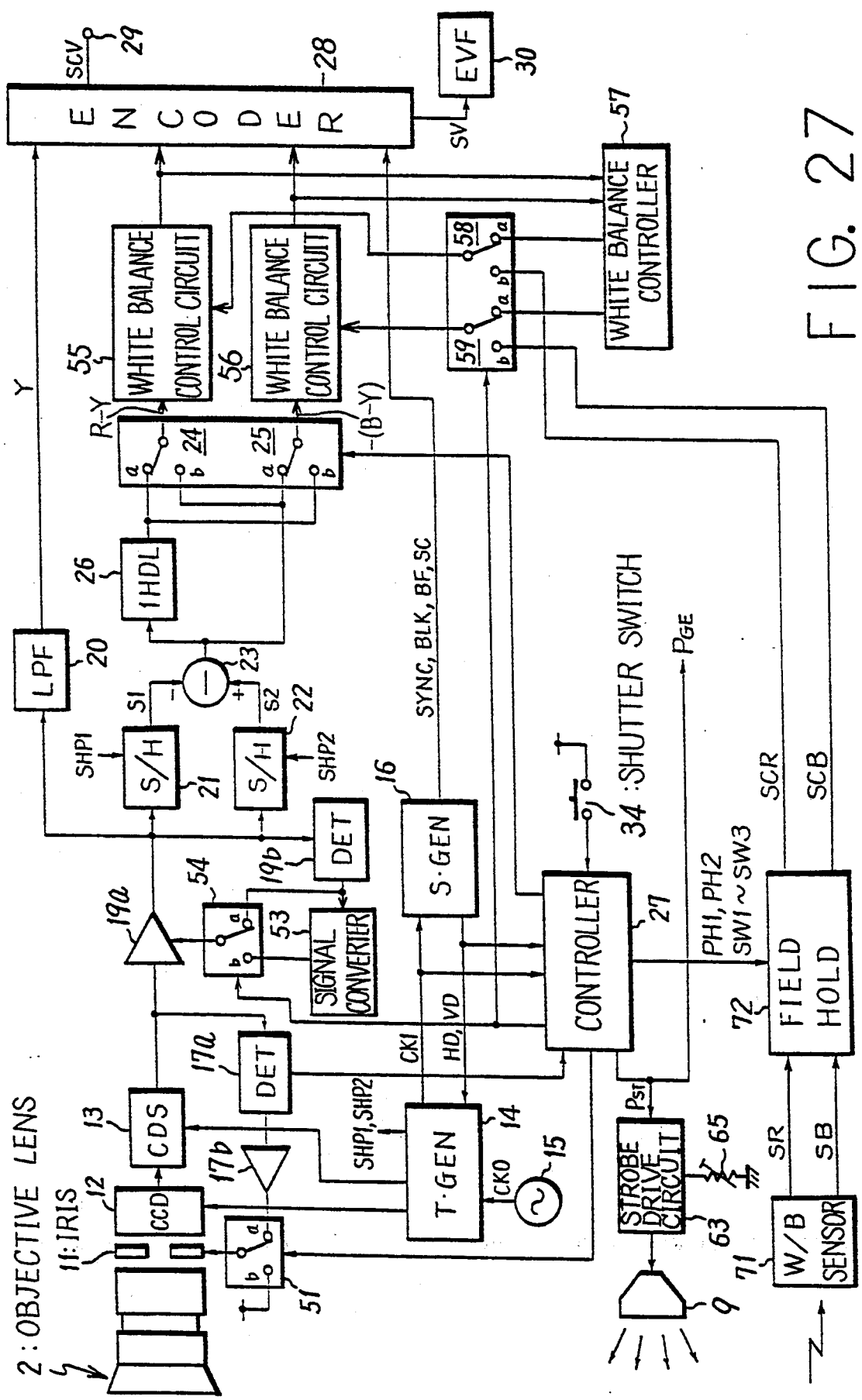
FIG. 27 is a schematic block diagram of a still further video camera section.

Now, another embodiment of the present invention will be described with reference to the drawings. FIG. 27 is a schematic block diagram of the video camera section of this embodiment. In FIG. 27, parts in common with the representation in FIG. 22 are designated with the same reference numerals, and they are not described in detail any further.

In the Figure, designated at 71 is a white balance sensor which obtains colour temperature information for white balance control. A red colour information signal SR and a blue colour information signal SB outputted from this white balance sensor 71 are supplied to a field hold 72.

To the field hold 72 is supplied hold pulses PH1 and PH2, and selecting switch control signals SW1 through SW3. From the field hold 72 are outputted a red colour control signal SCR and a blue colour control signal SCB. The red colour control signal SCR is next supplied to the fixed contact on b side of a selecting switch 58, and the blue colour control signal SCB is next supplied to the fixed contact on b side of a selecting switch 59.

Figure 28:
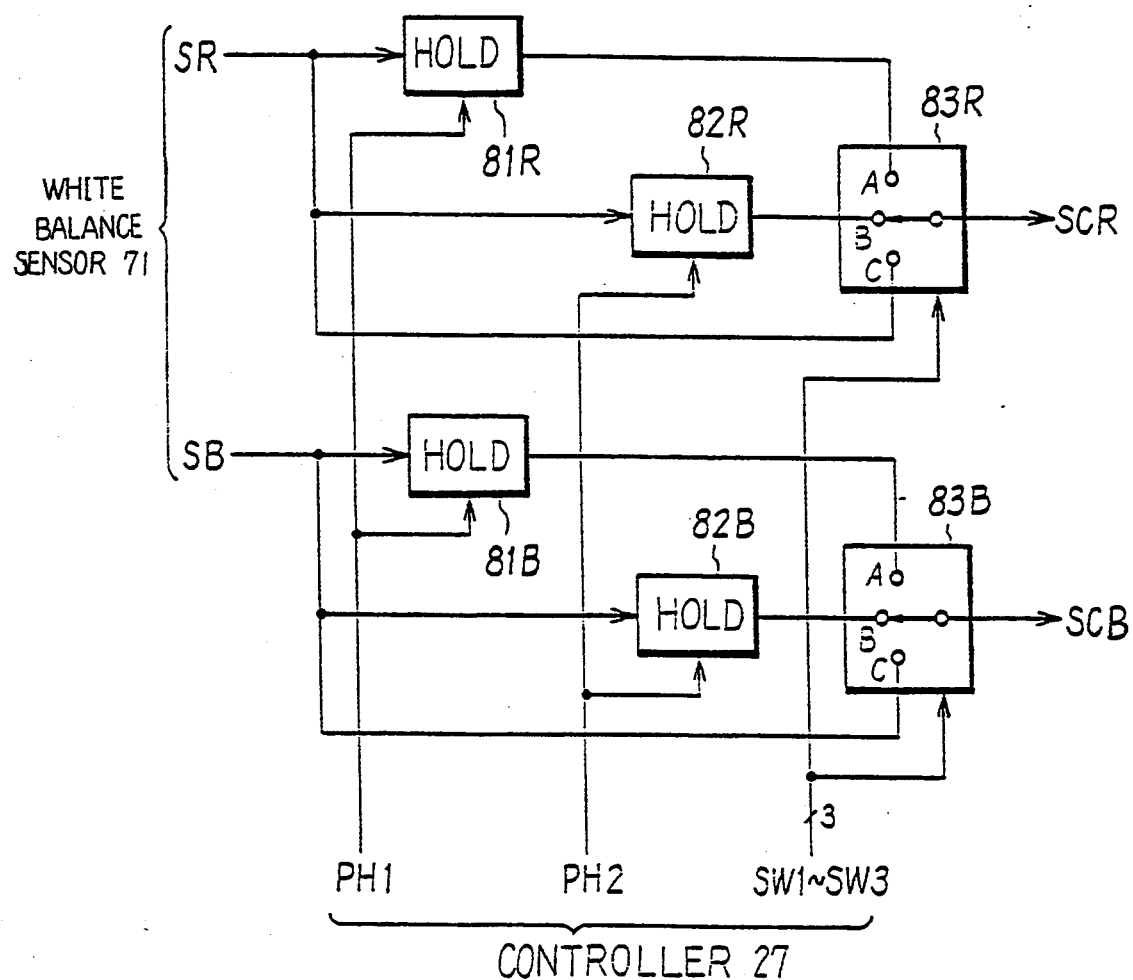
FIG. 28 is a schematic diagram showing construction of a field hold.

FIG. 28 is a schematic block diagram of the field hold 72 of this embodiment. In the Figure, a red colour information signal SR is supplied to holds 81R and 82R, and the fixed contact on c side of a selecting switch 83R. The output signals of the holds 81R and 82R are supplied to the fixed contact on A side and on B side of the selecting switch 83R, respectively. On the other hand, a blue colour information signal SB is supplied to holds 81B and 82B, and the fixed contact on c side of a selecting switch 83B. The output signals of the holds 81B and 82B are next supplied to the fixed contacts on A side and on B side of the selecting switch 83B, respectively.

To the hold 81R and 81B is supplied a hold pulse PH1 from a controller 27, at the same timing as the vertical sync signal VD on the starting point of the vertical scan period of light emission of a strobe 9 (as shown at J in FIG. 29). Accordingly, in the holds 81R and 81B are held a red colour information signal SR and a blue colour information signal SB, respectively, which are outputted from a white balance sensor 71 immediately before light emission of the strobe 9 is effected. Incidentally, shown at A through at G in FIG. 29 are the same signal as at A through at G in FIG. 25. Besides, shown at H and I in FIG. 29 are the red colour information signal SR and the a blue colour information signal SB, respectively.

On the other hand, to the hold 82R and 82B is supplied a hold pulse PH2 from a controller 27, at the same timing as light emission of a strobe 9 (as shown at K in FIG. 29). Accordingly, in the hold 82R and 82B is held a red colour information signal SR and a blue colour information signal SB, respectively, which are outputted from a white balance sensor 71 just when light emission of the strobe 9 is effected. These colour information signals SR and SB contain not only the colour temperature information of the strobe 9, but also that of other sources of light (for example, room lamps etc).

Further, to selecting switches 83R and 83B are supplied selecting switch control signals SW1 through SW3, (as shown at L through at N in FIG. 29, respectively). In the vertical scan period of light emission of a strobe 9, the level of a selecting switch control signal SW1 is set to be high level "H", SW2 to be low level "L", and SW3 to be low level "L"; so that connections in the selecting switches 83R and 83B are made on A side. In the next vertical scan period after light emission of the strobe 9 is effected, the level of the selecting switch control signal SW1 to be low level "L", SW2 is set to be high level "H", and SW3 to be low level "L"; so that connections in the selecting switches 83R and 83B are made on B side. And in other periods, all the selecting switch control signals SW1 through SW3 are set to be low level "L"; so that connections in the selecting switches 83R and 83B are made on C side.

Accordingly, the following signals are outputted as a red colour control signal SCR and a blue colour control signal SCB from the selecting switches 83R and 83B, respectively. That is to say, a red colour information signal SR and a blue colour information signal SB, which are respectively outputted from a white balance sensor 71 immediately before light emission of the strobe 9 is effected, are outputted in the vertical scan period of light emission of the strobe 9. On the other hand, the red colour information signal SR and the blue colour information signal SB, which are respectively outputted from the white balance sensor 71 when light emission of the strobe 9 is effected, are outputted in the next vertical scan period after light emission of the strobe 9 is effected. And in other periods, the red colour information signal SR and the blue colour information signal SB, which are respectively outputted from the white balance sensor 71 during these periods, are outputted. Shown at O and P in FIG. 29 are the red colour control signal SCR and the blue colour control signal SCB, respectively.

In the above construction, since connections in selecting switches 58 and 59 are made on b side (as shown at F in FIG. 29) in the next vertical scan period after light emission of a strobe 9 is effected, a red colour control signal SCR and a blue colour control signal SCB outputted from a field hold 72: that is, a red colour information signal SR and a blue colour information signal SB outputted from a white balance sensor 71 when light emission of the strobe 9 is effected: are supplied to circuits 55 and 56 for white balance control. Circuits 55 and 56 control white balance corresponding to colour temperature of the strobe 9 and other sources of light (for example, room lamps etc). Accordingly, the white balance of an image picked-up signal (afterwards, a colour difference signal), which is outputted from an image pick-up device 12 when light emission of the strobe 9 is effected, may certainly be performed regardless of effect of other sources of light.

In a field hold 72 of the embodiment described above: in holds 81R and 81B are held a red colour information signal SR and a blue colour information signal SB, which are outputted immediately before light emission of a strobe 9 is effected. Although connections in selecting switches 83R and 83B are made on A side in the vertical scan period of light emission of the strobe 9, a red colour control signal SCR and a blue colour control signal SCB outputted from the field hold 72 are not used because connections in selecting switches 58 and 59 are made on a side during that period. In a sense above, the holds 81R and 81B in the field hold 72 become useless, and connections in the selecting switches 83R and 83B need not be made on A side. In addition, connections in the selecting switches 83R and 83B need not be made on C side, too. In effect, What is necessary is the construction in such a way that the connections in the selecting switches 83R and 83B are to be made on B side in the next vertical scan period after light emission of the strobe 9 is effected.

The reason why a field hold 72 is constructed as shown in FIG. 28 is to permit white balance control in a certain configuration by means of only a red colour control signal SCR and a blue colour control signal SCB, which are outputted from the field hold 72. In the configuration, since the red colour control signal SCR and the blue colour control signal SCB are directly supplied to white balance control circuits 55 and 56 respectively, selecting switches 58, 59, and a white balance controller 57 become useless.

In this case, in the vertical scan period of light emission of a strobe 9, to the circuit 55 and 56 is not supplied an image picked-up signal, which is outputted from an image pick-up device 12 when light emission of the strobe 9 is effected. Accordingly, a red colour information signal SR and a blue colour information signal SB immediately before light emission of the strobe 9 is effected, is usefully outputted as a red colour control signal SCR and a blue colour control signal SCB, through connections in selecting switches 83R and 83B being made on A side.

It will be obvious to those having ordinary skill in the art that many changes may be made in the above described details of the preferred embodiment of the present invention without departing from the sprit and scope of the present invention.

We claim:

1. A video camera comprising:

an iris having an aperture, said iris for controlling an amount of incident light on an image pick-up device;

an Auto-Gain-Control amplifier for controlling the level of a picked-up image signal outputted from said image pick-up device;

mode setting means for setting a light emission mode in which a light emission means is used;

voltage detection means for detecting a charge voltage of said light emission means; and control means for reducing said aperture of said iris and fixing the gain of said Auto-Gain-Control amplifier at a predetermined value when a condition of said charge voltage exceeding a threshold value is detected by said voltage detection means when said mode setting means has set said light emission mode.

2. A video camera according to claim 1, wherein said control means timely outputs a take-in pulse in accordance with output of a frame of said picked-up image signal from said image pick-up device when said picked up image signal is picked up with light emission of said light emission means.

3. A video camera according to claim 1, wherein said light emission means is a strobe.

4. A video camera according to claim 1, wherein said light emission means effects light emission in response to operation of a shutter switch when the charge voltage of said light emission means exceeds a threshold value.

5. A video camera according to claim 2, wherein said take-in pulse is used as a timing signal for latching said frame of said image picked-up signal into a still image recorder.

* * * * *

UNITED STATES PATENT AND TRADEMARK OFFICE
CERTIFICATE OF CORRECTION

PATENT NO : 5,410,225
DATED : April 25, 1995
INVENTOR(S) : Hiroyuki Hashimoto, et. al.

It is certified that error appears in the above-identified patent and that said Letters Patent is hereby corrected as shown below:

Title page, item [75], inventor: Delete the name Satoshi Ishii.

Signed and Sealed this

Twenty-seventh Day of June, 1995

Attest:

BRUCE LEHMAN

Attesting Officer

Commissioner of Patents and Trademarks